US012638656B2

(12) United States Patent
Kim

(10) Patent No.: US 12,638,656 B2
(45) Date of Patent: May 26, 2026

(54) OPTICAL IMAGING SYSTEM

(71) Applicant: SAMSUNG ELECTRO-MECHANICS CO., LTD., Suwon-si (KR)

(72) Inventor: Jong Pil Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 264 days.

(21) Appl. No.: 18/492,950

(22) Filed: Oct. 24, 2023

(65) Prior Publication Data

US 2024/0219685 A1      Jul. 4, 2024

(30) Foreign Application Priority Data

Dec. 28, 2022    (KR) ......................... 10-2022-0186854

(51) Int. Cl.
*G02B 9/62* (2006.01)
*G02B 13/18* (2006.01)

(52) U.S. Cl.
CPC .............. *G02B 9/62* (2013.01); *G02B 13/18* (2013.01)

(58) Field of Classification Search
None
See application file for complete search history.

(56) References Cited

U.S. PATENT DOCUMENTS

| | | | |
|---|---|---|---|
| 2014/0063616 | A1 | 3/2014 | Okano et al. |
| 2015/0124333 | A1 | 5/2015 | Noda et al. |

| | | | |
|---|---|---|---|
| 2016/0116715 | A1 | 4/2016 | Ota |
| 2016/0119519 | A1 | 4/2016 | Chen et al. |
| 2018/0095249 | A1 | 4/2018 | Hsueh et al. |
| 2019/0278044 | A1 | 9/2019 | Zhang et al. |
| 2019/0285843 | A1 | 9/2019 | Chang et al. |
| 2020/0150386 | A1* | 5/2020 | Wei .................... G02B 13/0045 |
| 2020/0209573 | A1 | 7/2020 | Yamazaki et al. |
| 2020/0209584 | A1* | 7/2020 | Guo ................... G02B 13/0045 |

(Continued)

FOREIGN PATENT DOCUMENTS

| | | |
|---|---|---|
| CN | 109765677 A | 5/2019 |
| CN | 210626762 U | 5/2020 |

(Continued)

OTHER PUBLICATIONS

Taiwanese Office Action issued on Apr. 29, 2024, in counterpart Taiwanese Patent Application No. 112141195 (6 pages in English, 8 pages in Chinese).

(Continued)

*Primary Examiner* — Darryl J Collins
(74) *Attorney, Agent, or Firm* — NSIP Law

(57) ABSTRACT

An optical imaging system is provided. The optical imaging system includes a first lens, a second lens, a third lens, a fourth lens, a fifth lens, and a sixth lens sequentially disposed from an object side to an imaging side. In the optical imaging system, the first lens has positive refractive power and has a concave object-side surface, the fourth lens has negative refractive power, and the fifth lens has a convex image-side surface. Additionally, the optical imaging system satisfies the following conditional expressions: f number<1.90 and 1.90<TTL/f<2.2. In the conditional expressions, TTL is a distance from an object-side surface of the first lens to an image plane, and f is a focal length of the optical imaging system.

19 Claims, 15 Drawing Sheets

(56) References Cited

U.S. PATENT DOCUMENTS

| | | | | |
|---|---|---|---|---|
| 2020/0241244 | A1* | 7/2020 | Chen | G02B 9/64 |
| 2020/0326510 | A1* | 10/2020 | Chen | G02B 13/02 |
| 2020/0409081 | A1 | 12/2020 | Teranishi et al. | |
| 2021/0333514 | A1 | 10/2021 | Zhou et al. | |
| 2021/0364739 | A1* | 11/2021 | Chen | G02B 9/64 |
| 2022/0091394 | A1 | 3/2022 | Jang et al. | |
| 2022/0107481 | A1* | 4/2022 | Li | G02B 13/0045 |
| 2022/0159156 | A1* | 5/2022 | Zhang | G02B 13/04 |
| 2022/0187574 | A1 | 6/2022 | Yamazaki et al. | |
| 2022/0269044 | A1* | 8/2022 | Li | G02B 9/62 |
| 2022/0390714 | A1 | 12/2022 | Zhu et al. | |
| 2023/0094454 | A1 | 3/2023 | Lin et al. | |

FOREIGN PATENT DOCUMENTS

| | | |
|---|---|---|
| CN | 111399185 A | 7/2020 |
| CN | 110286472 B | 9/2021 |
| CN | 113866945 A | 12/2021 |
| CN | 114594578 A | 6/2022 |
| JP | 2015-72405 A | 4/2015 |
| JP | 2015-163927 A | 9/2015 |
| JP | 2016-85390 A | 5/2016 |
| JP | 2020-106817 A | 7/2020 |
| JP | 2022-120334 A | 8/2022 |
| TW | M471595 U | 2/2014 |
| TW | I537588 B | 6/2016 |
| TW | 201814347 A | 4/2018 |
| TW | 202225758 A | 7/2022 |
| TW | I776707 B | 9/2022 |
| TW | 202248707 A | 12/2022 |

OTHER PUBLICATIONS

Korean Office Action issued on Dec. 4, 2024 in corresponding Korean Patent Application No. 10-2022-0186854. (9 pages in English, 7 pages in Korean).

Taiwanese Office Action issued on Oct. 8, 2025, in counterpart Taiwanese Patent Application No. 114129513(7 pages in English, 6 pages in Chinese).

* cited by examiner

OPTICAL IMAGING SYSTEM

CROSS-REFERENCE TO RELATED APPLICATIONS

This application claims the benefit under 35 USC § 119(a) of Korean Patent Application No. 10-2022-0186854 filed on Dec. 28, 2022, in the Korean Intellectual Property Office, the entire disclosure of which is incorporated herein by reference for all purposes.

BACKGROUND

1. Field

The following description relates to an optical imaging system.

2. Description of Related Art

An augmented reality implementation device may include an optical element that recognizes a user's eyes. For example, augmented reality (AR) glasses include a camera module configured to recognize a user's iris. The camera module for AR glasses should accurately recognize a position of the user's iris and exhibit constant optical performance even with an ambient temperature change, and may thus desire an optical imaging system having high resolution and non-degraded performance.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens having positive refractive power, and having a concave object-side surface; a second lens having refractive power; a third lens having refractive power; a fourth lens having negative refractive power; a fifth lens having a convex image-side surface; and a sixth lens having refractive power, wherein the first lens to the sixth lens are sequentially disposed from an object side to an image side, and wherein f number<1.90 and 1.90<TTL/f<2.2, where TTL is a distance from an object side of the first lens to an image plane, and f is a focal length of the optical imaging system.

The optical imaging system may satisfy the conditional expression $0<f1/f<20$, where f1 is a focal length of the first lens.

The optical imaging system may satisfy the conditional expression $-100<f2/f<100$, where f2 is a focal length of the second lens.

The optical imaging system may satisfy the conditional expression $-30<V1-V2<40$, where V1 is an Abbe number of the first lens and V2 is an Abbe number of the second lens.

The optical imaging system may satisfy the conditional expression $0.09<D12/f<0.10$, where D12 is a distance from an image-side surface of the first lens to an object-side surface of the second lens.

The optical imaging system may satisfy the conditional expression $0.09<D23/f<0.10$, where D23 is a distance from an image-side surface of the second lens to an object-side surface of the third lens.

The optical imaging system may satisfy the conditional expression $0.20<BFL/TLx<3.0$, where BFL is a distance from an image-side surface of the sixth lens to the image plane, and TLx is a distance from a point closest to an object on an object-side surface of the first lens to the image plane.

An electronic device may include the optical imaging system.

In a general aspect, an optical imaging system includes a first lens having a concave object-side surface; a second lens having refractive power; a third lens having refractive power; a fourth lens having a concave object-side surface; a fifth lens having refractive power; and a sixth lens having refractive power, wherein the first lens to the sixth lens are sequentially disposed from an object side to an imaging side, and wherein $-1.0<f3/f4<-0.8$ and $1.90<TTL/f<2.20$, where TTL is a distance from an object-side surface of the first lens to an image plane, f is a focal length of the optical imaging system, f3 is a focal length of the third lens, and f4 is a focal length of the fourth lens.

In the optical imaging system, the f number may be less than 1.90.

The optical imaging system may satisfy the conditional expression $1.64<TTL/ImgHT<1.86$, where ImgHT is a height of the image plane.

The optical imaging system may satisfy the conditional expression $0.70<f3/ImgHT<1.0$, where ImgHT is a height of the image plane.

The optical imaging system may satisfy the conditional expression $-1.1<f3/f6<0.80$, where f6 is a focal length of the sixth lens.

The optical imaging system may satisfy the conditional expression $0.90<f4/f6<1.20$, where f6 is a focal length of the sixth lens.

The optical imaging system may satisfy the conditional expression $-0.80<(R11+R12)/f6<-0.60$, where R11 is a radius of curvature of an object-side surface of the sixth lens, R12 is a radius of curvature of an image-side surface of the sixth lens, and f6 is a focal length of the sixth lens.

The optical imaging system may satisfy the conditional expression $14<DTn1/DTn2<15$, where DTn1 is a refractive index temperature coefficient according to a temperature change of the first lens, and DTn2 is a refractive index temperature coefficient according to a temperature change of the second lens.

The optical imaging system may satisfy the conditional expression $1.50<(DTn1+DTn3)/(DTn2+DTn4)<1.70$, where DTn1 is a refractive index temperature coefficient according to a temperature change of the first lens, DTn2 is a refractive index temperature coefficient according to a temperature change of the second lens, DTn3 is a refractive index temperature coefficient according to a temperature change of the third lens, and DTn4 is a refractive index temperature coefficient according to a temperature change of the fourth lens.

In a general aspect, an optical imaging system includes a first lens, a second lens, a third lens, a fourth lens, a fifth lens, and a sixth lens; wherein the first lens has a concave object-side surface, wherein the fourth lens has a concave object-side surface, wherein the fifth lens has a concave object-side surface; wherein the sixth lens has negative refractive power; wherein the first lens to the sixth lens are sequentially disposed from an object side to an image side, and wherein $1.90<TTL/f<2.2$, where TTL is a distance from an object side of the first lens to an image plane, and f is a focal length of the optical imaging system.

An electronic device may include the respective optical imaging systems.

Other features and examples will be apparent from the following detailed description, the drawings, and the claims.

Figure 1:
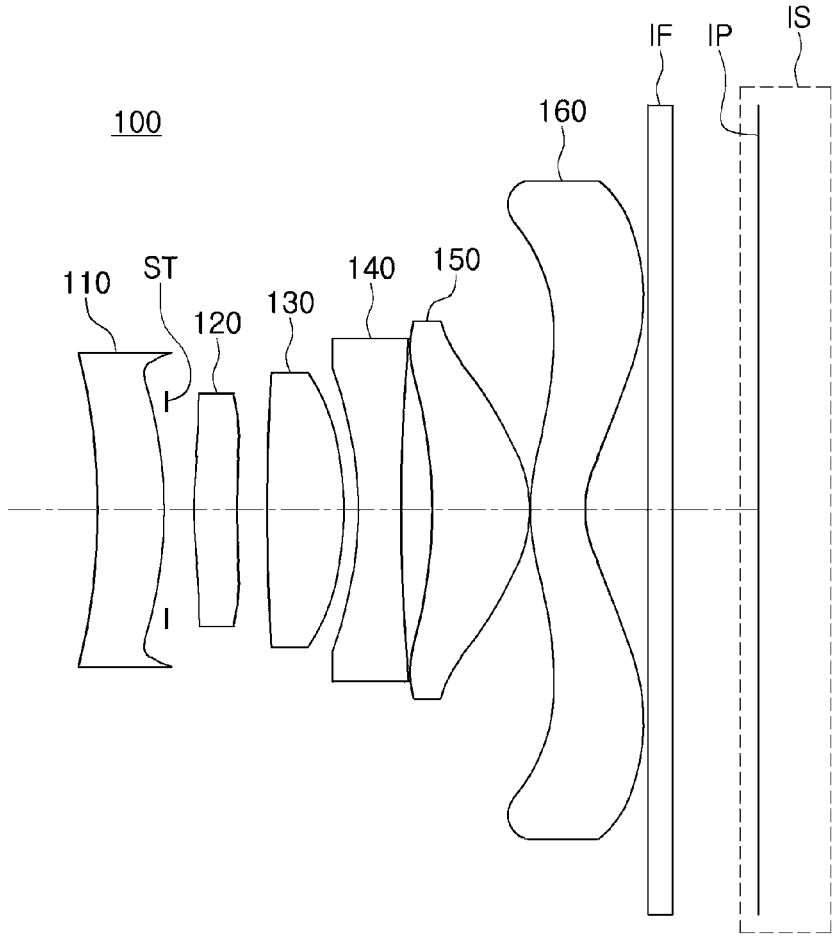
FIG. 1 is a configuration diagram illustrating an example optical imaging system according to a first example embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples may provide an optical imaging system that has high resolution and non-degraded performance.

One or more examples may provide an optical imaging system which has a very small total track length (TTL), thereby reducing a size and weight of an AR device.

In the one or more examples, optical performance of the optical imaging system may not degrade in a range of minus 20 degrees to 60 degrees, thereby improving operational reliability of the AR device.

In the one or more examples, a first lens refers to a lens closest to an object (or a subject), and a sixth lens refers to a lens closest to an image plane (or an image sensor). In the one or more examples, units of a radius of curvature, a thickness, a total track length (TTL) (a distance from an object-side surface of the first lens to an image plane), TLx (a distance from a point closest to an object on an object-side surface of the first lens to an image plane), image height (ImgHT) (a height of an image plane), and a focal length of a lens may be indicated in "mm."

A thickness of a lens, a distance between lenses, and TTL may be distances calculated based on an optical axis of a lens. Additionally, in the description of a shape of a lens in the one or more examples, one surface that is convex means that a paraxial region of the surface is convex, and one surface that is concave means that the paraxial region of the surface is concave. Therefore, even when it is described that one surface of the lens is convex, an edge portion of the lens may be concave. Similarly, even when it is described that one surface of the lens is concave, the edge portion of the lens may be convex.

An optical imaging system according to a first example may include a plurality of lenses. For example, the optical imaging system may include a first lens, a second lens, a third lens, a fourth lens, a fifth lens, and a sixth lens sequentially disposed from an object side to an imaging side. The optical imaging system according to the first example may include a lens having positive refractive power and a lens having negative refractive power. For example, in the optical imaging system, the first lens may have positive refractive power and the fourth lens may have negative refractive power. The optical imaging system according to the first example may respectively include a lens having a concave object-side surface and a lens having a convex image-side surface. For example, in the optical imaging system, the first lens may have a concave object-side surface, and the fifth lens may have a convex image-side surface. The optical imaging system according to the first example may satisfy a specific conditional expression. For example, the optical imaging system according to the first example may satisfy the following conditional expressions: f number<1.90 and 1.90<TTL/f<2.2. In the conditional expressions, TTL may be a distance from an object side of the first lens to an image plane, and f may be a focal length of the optical imaging system.

An optical imaging system according to a second example may include a plurality of lenses. For example, the optical imaging system may include a first lens, a second lens, a third lens, a fourth lens, a fifth lens, and a sixth lens sequentially disposed from an object side to an imaging side. The optical imaging system according to the second example may include a lens having a concave object-side surface. For example, in the optical imaging system according to the second example, an object-side surface of the first lens and an object-side surface of the fourth lens may be concave. The optical imaging system according to the second example may satisfy a specific conditional expression. For example, the optical imaging system according to the second example may satisfy the following conditional expressions: $-1.0 < f3/f4 < -0.8$ and $1.90 < TTL/f < 2.20$. In the conditional expressions, TTL may be a distance from an object-side surface of the first lens to an image plane, f may be a focal length of the optical imaging system, f3 may be a focal length of the third lens, and f4 may be a focal length of the fourth lens.

An optical imaging system according to a third example may include first to sixth lenses sequentially disposed from an object side to an imaging side, and may satisfy one or more of the following conditional expressions.

$$0 < f1/f < 20$$

$$-100 < f2/f < 100$$

$$-30 < V1 - V2 < 40$$

$$TLx/f < 2.25$$

$$0.80 < L1TR/L2TR < 1.40$$

$$|f1/f2| < 2.0$$

$$-1.5 < f1/f2 < 0.5$$

$$BFL/f < 0.7$$

-continued $$0.09 < D12/f < 0.10$$

$$0.09 < D23/f < 0.10$$

$$0.20 < BFL/TLx < 3.0$$

In the conditional expressions above, f may be a focal length of the optical imaging system, f1 may be a focal length of the first lens, f2 may be a focal length of the second lens, V1 may be an Abbe number of the first lens, V2 may be an Abbe number of the second lens, TLx may be a distance from a point (limited to an effective region) closest to an object on an object-side surface of the first lens to an image plane, L1TR may be a maximum diameter (including a flange portion) of the first lens, L2TR may be a maximum diameter (including a flange portion) of the second lens, D12 may be a distance from an image-side surface of the first lens to an object-side surface of the second lens, D23 may be a distance from an image-side surface of the second lens to an object-side surface of the third lens, and BFL may be a distance from an image-side surface of the sixth lens to an image plane.

An example optical imaging system according to a fourth example may include first to sixth lenses sequentially disposed from an object side to an imaging side, and may satisfy one or more of the following conditional expressions.

$$f \text{ number} < 1.90$$

$$1.90 < TTL/f < 2.20$$

$$1.64 < TTL/ImgHT < 1.86$$

$$0.01 < (R1 - R2)/(R1 + R2) < 0.20$$

$$0.70 < f3/ImgHT < 1.0$$

$$-1.0 < f3/f4 < -0.80$$

$$-1.10 < f3/f6 < 0.80$$

$$0.90 < f4/f6 < 1.20$$

$$0.60 < (R5 + R6)/f3 < 1.0$$

$$0.40 < (R7 + R8)/f4 < 1.60$$

$$-3.0 < (R9 + R10)/f5 < -1.60$$

$$-0.80 < (R11 + R12)/f6 < -0.60$$

$$14 < DTn1/DTn2 < 15$$

$$1.50 < (DTn1 + DTn3)/(DTn2 + DTn4) < 1.70$$

In the conditional expressions above, TTL may be a distance from an object side-surface of the first lens to an image plane, ImgHT may be a height of the image plane, R1 may be a radius of curvature of the object-side surface of the first lens, R2 may be a radius of curvature of an image-side surface of the first lens, R5 may be a radius of curvature of an object-side surface of the third lens, R6 may be a radius of curvature of an image-side surface of the third lens, R7 may be a radius of curvature of an object-side surface of the fourth lens, R8 may be a radius of curvature of an image-side surface of the fourth lens, R9 may be a radius of curvature of the object-side surface of the fifth lens, R10 may be a radius of curvature of an image-side surface of the fifth lens, R11 may be a radius of curvature of an object-side surface of the sixth lens, R12 may be a radius of curvature of an image-side surface of the sixth lens, f3 may be a focal length of the third lens, f4 may be a focal length of the fourth lens, f5 may be a focal length of the fifth lens, f6 may be a focal length of the sixth lens, DTn1 may be a refractive index temperature coefficient [$10^{-6}/^{\circ}$ C.] according to a temperature change of the first lens, DTn2 may be a refractive index temperature coefficient according to a temperature change of the second lens, DTn3 may be a refractive index temperature coefficient according to a temperature change of the third lens, and DTn4 may be a refractive index temperature coefficient according to a temperature change of the fourth lens.

An example optical imaging system according to a fifth example may include features according to the third example and features according to the fourth example. For example, the optical imaging system according to the fifth example may satisfy one or more of the features (conditional expressions) according to the fourth example, while satisfying one or more of the features (conditional expressions) of the third example.

An example optical imaging system according to the one or more examples may include one or more lenses having the following features, as necessary. As an example, the optical imaging system according to the first example may include one of the first to sixth lenses according to the following features. As another example, the optical imaging systems according to the second to fifth examples may include one or more of the first to sixth lenses according to the following features. However, the optical imaging system according to the above-described example may not necessarily include a lens according to the following features. Hereinafter, features of the first to sixth lenses will be described.

The first lens may have refractive power. For example, the first lens may have positive refractive power. One side surface of the first lens may be concave. For example, an object-side surface of the first lens may be concave. The first lens may have a spherical surface or an aspherical surface. As an example, both surfaces of the first lens may be aspherical surfaces. The first lens may be formed of a material having high light transmittance and excellent processibility. For example, the first lens may be formed of a plastic material or a glass material. The first lens may have a predetermined refractive index. For example, the refractive index of the first lens may be greater than 1.5. As a specific example, the refractive index of the first lens may be greater than 1.5 and less than 1.6. The first lens may have a predetermined Abbe number. For example, the Abbe number of the first lens may be 50 or more. As a specific example, the Abbe number of the first lens may be greater than 50 and less than 60.

The second lens may have refractive power. For example, the second lens may have positive or negative refractive power. One side surface of the second lens may be convex. For example, an object-side surface of the second lens may be convex. The second lens may a spherical surface or an aspherical surface. As an example, both surfaces of the second lens may be aspherical surfaces. The second lens may be formed of a material having high light transmittance and excellent processibility. For example, the second lens may be formed of a plastic material or a glass material. The second lens may have a predetermined refractive index. For example, the refractive index of the second lens may be greater than 1.4. As a specific example, the refractive index of the second lens may be greater than 1.4 and less than 1.7. The second lens may have a predetermined Abbe number. For example, the Abbe number of the second lens may be 20 or more. As a specific example, the Abbe number of the second lens may be greater than 20 and less than 90.

The third lens may have refractive power. For example, the third lens may have positive refractive power. One side surface of the third lens may be convex. For example, an object-side surface of the third lens may be convex. The third lens may have a spherical surface or an aspherical surface. As an example, both surfaces of the third lens may be aspherical surfaces. The third lens may be formed of a material having high light transmittance and excellent processibility. For example, the third lens may be formed of a plastic material or a glass material. The third lens may have a predetermined refractive index. For example, the refractive index of the third lens may be greater than 1.5. As a specific example, the refractive index of the third lens may be greater than 1.5 and less than 1.6. The third lens may have a predetermined Abbe number. For example, the Abbe number of the third lens may be 50 or more. As a specific example, the Abbe number of the third lens may be greater than 50 and less than 60.

The fourth lens may have refractive power. For example, the fourth lens may have negative refractive power. One side surface of the fourth lens may be concave. For example, an object-side surface of the fourth lens may be concave. The fourth lens may have a spherical surface or an aspherical surface. As an example, both surfaces of the fourth lens may be aspherical surfaces. The fourth lens may be formed of a material having high light transmittance and excellent processibility. For example, the fourth lens may be formed of a plastic material or a glass material. The fourth lens may have a predetermined refractive index. For example, the refractive index of the fourth lens may be greater than 1.6. As a specific example, the refractive index of the fourth lens may be greater than 1.6 and less than 1.7. The fourth lens may have a predetermined Abbe number. For example, the Abbe number of the fourth lens may be 20 or more. As a specific example, the Abbe number of the fourth lens may be greater than 20 and less than 30.

The fifth lens may have refractive power. For example, the fifth lens may have positive refractive power. One side surface of the fifth lens may be convex. For example, an image-side surface of the fifth lens may be convex. The fifth lens may have a spherical surface or an aspherical surface. As an example, both surfaces of the fifth lens may be aspherical surfaces. The fifth lens may be formed of a material having high light transmittance and excellent processibility. For example, the fifth lens may be formed of a plastic material or a glass material. The fifth lens may have a predetermined refractive index. For example, the refractive index of the fifth lens may be greater than 1.5. As a specific example, the refractive index of the fifth lens may be greater than 1.5 and less than 1.6. The fifth lens may have a predetermined Abbe number. For example, the Abbe number of the fifth lens may be 50 or more. As a specific example, the Abbe number of the fifth lens may be greater than 50 and less than 60.

The sixth lens may have refractive power. For example, the sixth lens may have negative refractive power. One surface of the sixth lens may be convex. For example, an object-side surface of the sixth lens may be convex. The sixth lens may have a spherical surface or an aspherical surface. As an example, both surfaces of the sixth lens may be aspherical surfaces. The sixth lens may have an inflection point. As an example, an image-side surface of the sixth lens may have an inflection point. The sixth lens may be formed of a material having high light transmittance and excellent processibility. For example, the sixth lens may be formed of a plastic material. The sixth lens may have a predetermined refractive index. For example, the refractive index of the sixth lens may be greater than 1.5. As a specific example, the refractive index of the sixth lens may be greater than 1.5 and less than 1.6. The sixth lens may have a predetermined Abbe number. For example, the Abbe number of the sixth lens may be 50 or more. As a specific example, the Abbe number of the sixth lens may be greater than 50 and less than 60.

As described above, the first to sixth lenses may have a spherical surface or an aspherical surface. When the first to sixth lenses have an aspherical surface, an aspherical surface of a corresponding lens may be represented by Equation 1 below.

$$z = \frac{cr^2}{1 + \sqrt{1 - (2 + k)c^2 r^2}} + a_0 r^4 + a_1 r^6 + \qquad \text{Equation 1}$$
$$a_2 r^8 + a_3 r^{10} + a_4 r^{12} + a_5 r^{14} + a_6 r^{16} + a_7 r^{18} + \dots$$

In Equation 1, c may be a reciprocal of a radius of curvature of a corresponding lens, k may be a conic constant, r may be a distance from an arbitrary point on an aspherical surface to an optical axis, $a_0$ to $a_7$ may be aspherical constants, and Z (or SAG) may be a height in an optical axis direction from an arbitrary point on an aspherical surface to an apex of the aspherical surface.

The example optical imaging systems according to the above-described example embodiments or the above-described examples may further include an aperture and a filter. As an example, the optical imaging systems may further include an aperture disposed on a first lens and a second lens. The aperture may be configured to adjust an amount of light incident in a direction of an image plane. The filter may be disposed between a rearmost lens (sixth lens) and the image plane. The filter may be configured to block light having a specific wavelength. For reference, the filter described herein may be configured to block an infrared ray, but light having a wavelength blocked by the filter is not limited to the infrared ray.

An example optical imaging system according to specific example embodiments will be described with reference to the drawings.

First, an optical imaging system according to a first example embodiment will be described with reference to FIG. 1.

An example optical imaging system 100 may include a plurality of lenses sequentially disposed from an object side to an imaging side. For example, the optical imaging system 100 may include a first lens 110, a second lens 120, a third lens 130, a fourth lens 140, a fifth lens 150, and a sixth lens 160 sequentially disposed from the object side to the imaging side.

The first lens 110 may have positive refractive power, and may have a concave object-side surface and a convex image-side surface. The second lens 120 may have negative refractive power, and may have a convex object-side surface and a concave image-side surface. The third lens 130 may have positive refractive power, and may have a convex object-side surface and a convex image-side surface. The fourth lens 140 may have negative refractive power, and may have a concave object-side surface and a concave image-side surface. The fifth lens 150 may have positive refractive power, and may have a concave object-side surface and a convex image-side surface. The sixth lens 160 may have negative refractive power, and may have a convex object-side surface and a concave image-side surface. The sixth lens 160 may have an inflection point. For example, the object-side surface and the image-side surface of the sixth lens 160 may have an inflection point.

The optical imaging system 100 may further include other optical elements in addition to the first lens 110 to the sixth lens 160. For example, the optical imaging system 100 may further include an aperture ST and a filter IF.

The aperture ST may be disposed between the first lens 110 and the second lens 120, and the filter IF may be disposed between the sixth lens 160 and an image plane IP. In an example, the filter IF may be omitted, as necessary.

The image plane IP may be formed in a position in which light incident through the first lens 110 to the sixth lens 160 forms an image. For example, the image plane IP may be formed on a surface of an image sensor IS of a camera module or may be formed on an inside of the image sensor IS.

Figure 2:
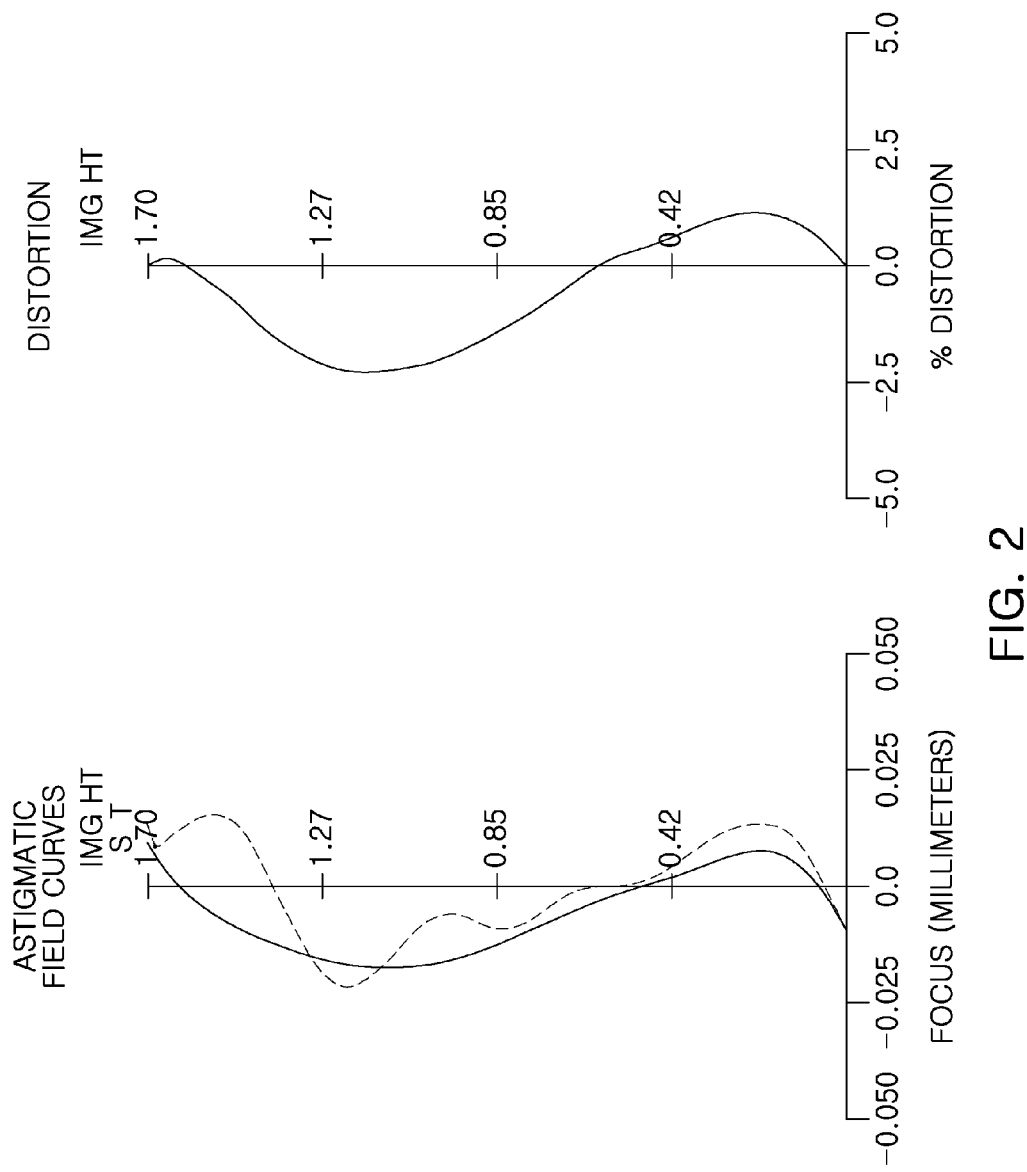
FIG. 2 is an aberration curve of the example optical imaging system illustrated in FIG. 1.

FIG. 2 illustrates aberration properties of the example optical imaging system 100 according to the present example embodiment. Tables 1 and 2 below illustrate lens properties and a distance between lens groups of the optical imaging system according to the present example embodiment.

TABLE 1

| Surface No. | Component | Radius of Curvature | Thickness/ Distance | Refractive Index | Abbe Number | Maximum Diameter | DTn |
|---|---|---|---|---|---|---|---|
| S0 | Object | Infinity | 1500 | | | | |
| S1 | | Infinity | 0.0963 | | | | |
| S2 | First lens | −1.4609 | 0.2860 | 1.541 | 56.0 | 1.263 | −94.643 |
| S3 | | −1.1991 | 0.0100 | | | | |
| S4 | Aperture | Infinity | 0.1291 | | | | |
| S5 | Second lens | 1.9236 | 0.1851 | 1.497 | 81.6 | 0.949 | −6.560 |
| S6 | | 1.6884 | 0.1379 | | | | |
| S7 | Third lens | 2.2143 | 0.3521 | 1.541 | 56.0 | 1.104 | −94.643 |
| S8 | | −1.0365 | 0.0627 | | | | |
| S9 | Fourth lens | −2.3292 | 0.1900 | 1.640 | 23.5 | 1.381 | −110.976 |
| S10 | | 1.5962 | 0.1450 | | | | |
| S11 | Fifth lens | −1.9813 | 0.4406 | 1.541 | 56.0 | 1.521 | −94.643 |
| S12 | | −0.4466 | 0.0100 | | | | |
| S13 | Sixth lens | 0.7784 | 0.2453 | 1.541 | 56.0 | 2.644 | −94.643 |
| S14 | | 0.3497 | 0.2798 | | | | |
| S15 | Filter | Infinity | 0.1100 | 1.517 | 64.2 | | |
| S16 | | Infinity | 0.1480 | | | | |
| S17 | Image plane | Infinity | 0.2405 | | | | |

TABLE 2

| Surface No. | S2 | S3 | S5 | S6 | S7 | S8 |
|---|---|---|---|---|---|---|
| K | −1.030E+01 | −6.189E−01 | −1.837E+01 | −3.776E+01 | −3.334E+01 | −1.900E+01 |
| A | 8.616E−02 | 8.709E−01 | −1.145E−02 | −5.196E−01 | 2.066E−01 | −6.275E−01 |
| B | −5.296E−01 | −2.563E+00 | −1.345E+01 | −1.013E+01 | −5.100E+00 | −2.404E+00 |
| C | 9.956E+00 | −2.825E−01 | 3.449E+02 | 1.360E+02 | 3.239E+01 | 2.740E+01 |
| D | −1.054E+02 | 9.022E+01 | −7.337E+03 | −1.760E+03 | −2.232E+02 | −1.642E+02 |
| E | 6.324E+02 | −7.409E+02 | 9.715E+04 | 1.541E+04 | 9.915E+02 | 5.548E+02 |
| F | −2.296E+03 | 3.102E+03 | −7.904E+05 | −8.289E+04 | −2.143E+03 | −1.048E+03 |
| G | 4.999E+03 | −6.636E+03 | 3.834E+06 | 2.655E+05 | 1.802E+03 | 8.479E+02 |
| H | −6.029E+03 | 4.147E+03 | −1.013E+07 | −4.532E+05 | 0.000E+00 | 0.000E+00 |

| Surface No. | S9 | S10 | S11 | S12 | S13 | S14 |
|---|---|---|---|---|---|---|
| K | −7.777E+01 | −6.925E+00 | −1.150E+01 | −1.067E+00 | −2.086E+01 | −4.179E+00 |
| A | −5.977E−01 | −1.124E+00 | −3.159E−01 | 1.256E+00 | 9.879E−01 | −2.358E−01 |
| B | −8.959E+00 | 5.072E+00 | 2.071E+00 | 3.064E+00 | −6.800E+00 | −5.370E−01 |
| C | 8.945E+01 | −3.133E+01 | −5.091E+00 | −8.368E+01 | 2.022E+01 | 1.918E+00 |
| D | −4.955E+02 | 1.457E+02 | −6.769E+01 | 5.760E+02 | −3.694E+01 | −2.762E+00 |
| E | 1.983E+03 | −4.163E+02 | 4.543E+02 | −2.211E+03 | 4.399E+01 | 2.119E+00 |
| F | −5.394E+03 | 7.137E+02 | −1.100E+03 | 5.133E+03 | −3.449E+01 | −8.502E−01 |
| G | 8.498E+03 | −6.535E+03 | 1.289E+03 | −7.016E+03 | 1.712E+01 | 1.187E−01 |
| H | −5.689E+03 | 2.377E+02 | −7.288E+02 | 5.160E+03 | −4.848E+00 | 2.592E−02 |

Figure 3:
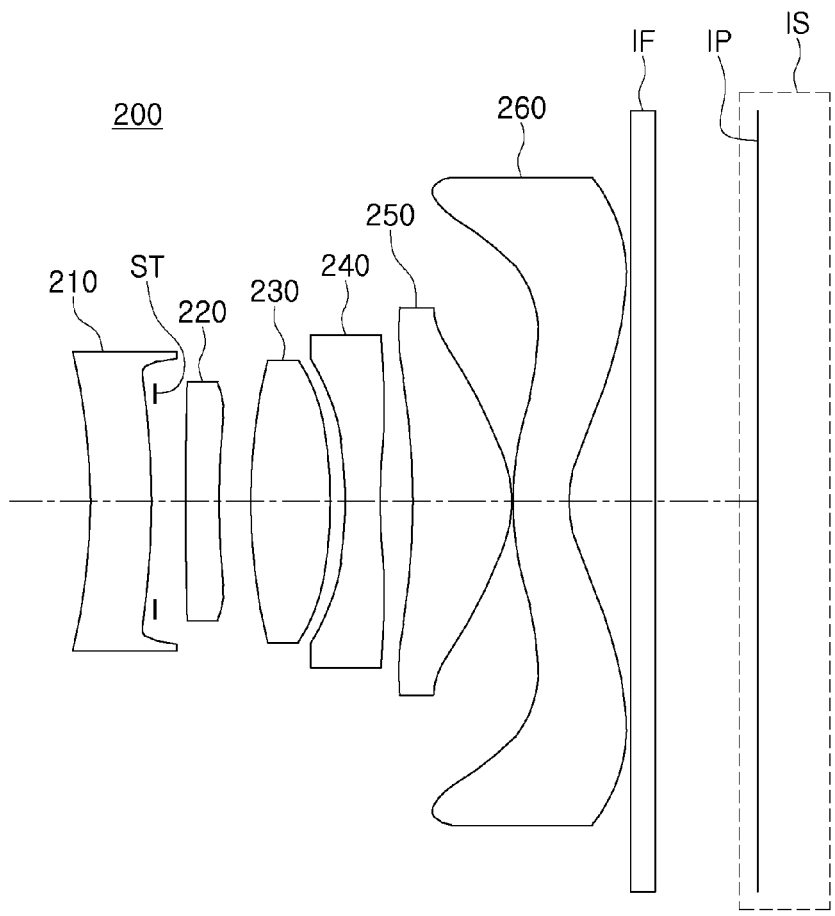
FIG. 3 is a configuration diagram illustrating an example optical imaging system according to a second example embodiment.

An example optical imaging system according to a second example embodiment will be described with reference to FIG. 3.

An example optical imaging system 200 may include a plurality of lenses sequentially disposed from an object side to an imaging side. For example, the optical imaging system 200 may include a first lens 210, a second lens 220, a third lens 230, a fourth lens 240, a fifth lens 250, and a sixth lens 260 sequentially disposed from the object side to the imaging side.

The first lens 210 may have positive refractive power, and may have a concave object-side surface and a convex image-side surface. The second lens 220 may have negative refractive power, and may have a convex object-side surface and a concave image-side surface. The third lens 230 may have positive refractive power, and may have a convex object-side surface and a convex image-side surface. The fourth lens 240 may have negative refractive power, and may have a concave object-side surface and a concave image-side surface. The fifth lens 250 may have positive refractive power, and may have a concave object-side surface and a convex image-side surface. The sixth lens 260 may have negative refractive power, and may have a convex object-side surface and a concave image-side surface. The sixth lens 260 may have an inflection point. For example, the object-side surface and the image-side surface of the sixth lens 260 may have an inflection point.

The optical imaging system 200 may further include other optical elements in addition to the first lens 210 to the sixth lens 260. For example, the optical imaging system 200 may further include an aperture ST and a filter IF.

The aperture ST may be disposed between the first lens 210 and the second lens 220, and the filter IF may be disposed between the sixth lens 260 and an image plane IP. For reference, the filter IF may be omitted, as necessary. The image plane IP may be formed in a position in which light incident through the first lens 210 to the sixth lens 260 forms an image. For example, the image plane IP may be formed on a surface of an image sensor IS of a camera module or may be formed on an inside of the image sensor IS.

Figure 4:
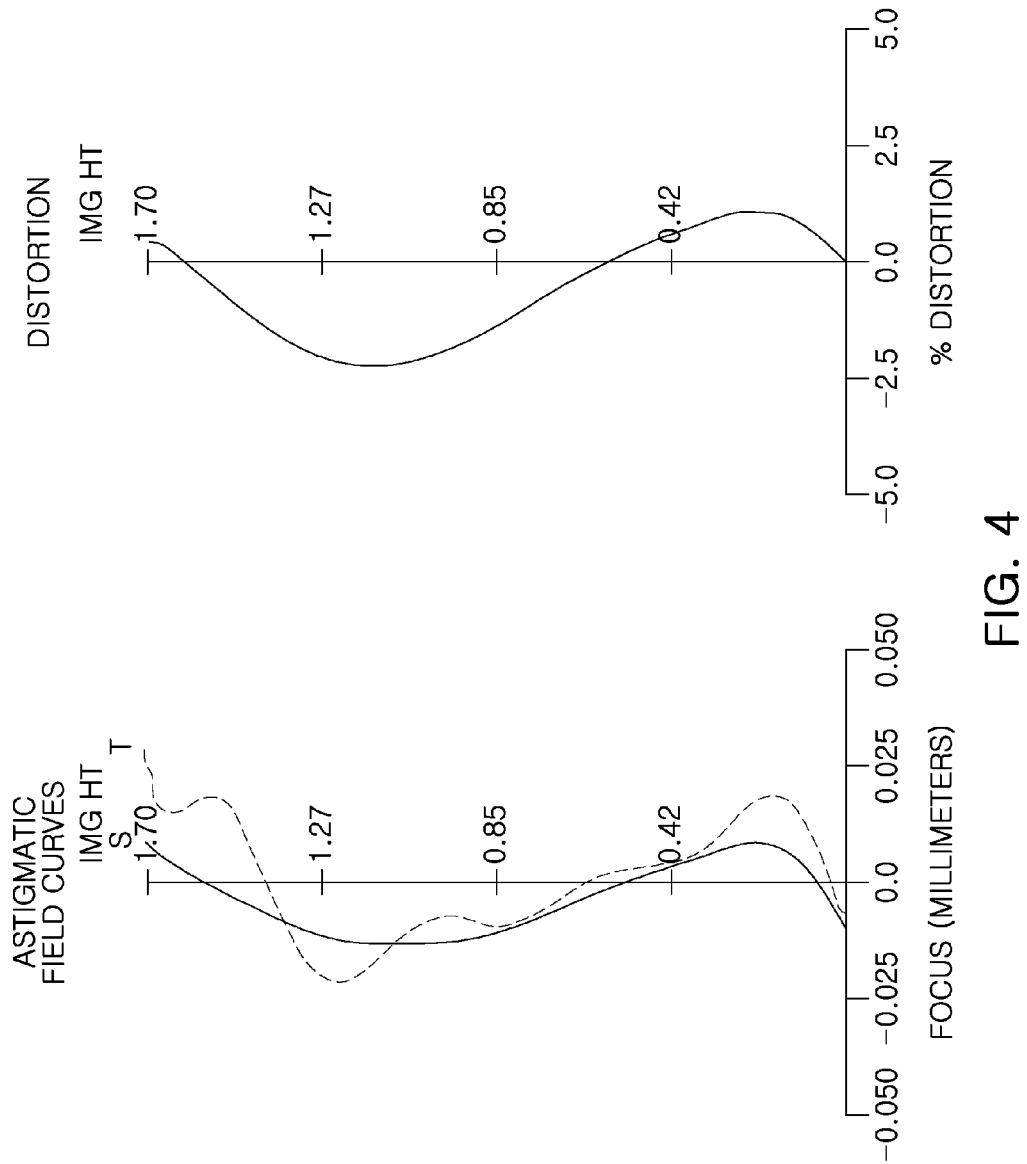
FIG. 4 is an aberration curve of the example optical imaging system illustrated in FIG. 3.

FIG. 4 illustrates aberration properties of the example optical imaging system 200 according to the present example embodiment. Tables 3 and 4 below illustrate lens properties and a distance between lens groups of the optical imaging system according to the present example embodiment.

TABLE 3

| Surface No. | Component | Radius of Curvature | Thickness/ Distance | Refractive Index | Abbe Number | Maximum Diameter | DTn |
|---|---|---|---|---|---|---|---|
| S0 | Object | Infinity | 1500.0000 | | | | |
| S1 | | Infinity | 0.0759 | | | | |
| S2 | First lens | −1.5096 | 0.2860 | 1.541 | 56.0 | 1.180 | −94.643 |
| S3 | | −1.4616 | 0.0100 | | | | |
| S4 | Aperture | Infinity | 0.1291 | | | | |
| S5 | Second lens | 1.8343 | 0.1574 | 1.640 | 23.5 | 0.937 | −6.560 |
| S6 | | 1.5969 | 0.1379 | | | | |
| S7 | Third lens | 1.4398 | 0.3521 | 1.541 | 56.0 | 1.104 | −94.643 |
| S8 | | −1.4644 | 0.0627 | | | | |
| S9 | Fourth lens | −2.5941 | 0.1600 | 1.640 | 23.5 | 1.312 | −110.976 |
| S10 | | 1.8158 | 0.1450 | | | | |
| S11 | Fifth lens | −2.1066 | 0.4406 | 1.541 | 56.0 | 1.516 | −94.643 |
| S12 | | −0.4588 | 0.0100 | | | | |
| S13 | Sixth lens | 0.7748 | 0.2453 | 1.541 | 56.0 | 2.530 | −94.643 |
| S14 | | 0.3625 | 0.2812 | | | | |
| S15 | Filter | Infinity | 0.1100 | 1.517 | 64.2 | | |
| S16 | | Infinity | 0.1494 | | | | |
| S17 | Image plane | Infinity | 0.3094 | | | | |

TABLE 4

| Surface No. | S2 | S3 | S5 | S6 | S7 | S8 |
|---|---|---|---|---|---|---|
| K | −1.3400E+01 | −7.1005E−01 | −3.0263E+01 | −3.8445E+01 | −1.1515E+01 | −2.8209E+01 |
| A | 1.2655E−01 | 7.9193E−01 | −2.3036E−01 | −7.1992E−01 | 1.4269E−01 | −2.7510E−01 |
| B | −4.5816E+01 | 4.1300E−01 | −1.0861E+01 | −7.6254E+00 | −2.3765E+00 | −5.7953E+00 |
| C | 1.0692E+01 | −6.1341E+01 | 2.7738E+02 | 1.3564E+02 | 1.5743E+01 | 4.6397E+01 |
| D | −1.2048E+02 | 9.1400E+02 | −5.7054E+03 | −2.1516E+03 | −1.0363E+02 | −2.3699E+02 |
| E | 7.4910E+02 | −7.4452E+03 | 7.4177E+04 | 2.3132E+04 | 4.7880E+02 | 6.6704E+02 |
| F | −2.8015E+03 | 3.3440E+04 | −6.0276E+05 | −1.5652E+05 | −1.1563E+03 | −9.7488E+02 |
| G | 6.2516E+03 | −6.7864E+04 | 2.9583E+06 | 6.4343E+05 | 1.0832E+03 | 5.8653E+02 |
| H | 0 | 0 | 0 | 0 | 0 | 0 |

| Surface No. | S9 | S10 | S11 | S12 | S13 | S14 |
|---|---|---|---|---|---|---|
| K | 1.5575E+00 | −1.3442E+01 | −2.4436E+01 | −1.0986E+00 | −1.1784E+01 | −3.3647E+00 |
| A | −7.9144E−01 | −1.2941E+00 | −3.0623E−01 | 1.5763E+00 | 4.4768E−01 | −4.1536E−01 |
| B | −5.6787E+00 | 8.8736E+00 | 8.5365E+00 | −7.6435E−01 | −4.9468E+00 | 5.0406E−01 |
| C | 1.7832E+01 | −7.9208E+01 | −7.1181E+01 | −4.3434E+01 | 1.8033E+01 | −6.7167E−01 |
| D | 1.4564E+02 | 4.4906E+02 | 3.1853E+02 | 3.2951E+02 | −4.3779E+01 | 7.3536E−01 |
| E | −1.2624E+03 | −1.5471E+03 | −1.0140E+03 | −1.2725E+03 | 6.9964E+01 | −5.8731E−01 |

TABLE 4-continued

| | | | | | | |
|---|---|---|---|---|---|---|
| F | 4.1300E+03 | 3.2363E+03 | 2.4215E+03 | 2.8879E+03 | −7.1146E+01 | 3.2975E−01 |
| G | −6.3151E+03 | −3.7296E+03 | −3.8104E+03 | −3.8006E+03 | 4.3752E+01 | −1.2886E−01 |
| H | 0 | 0 | 0 | 0 | 0 | 0 |

Figure 5:
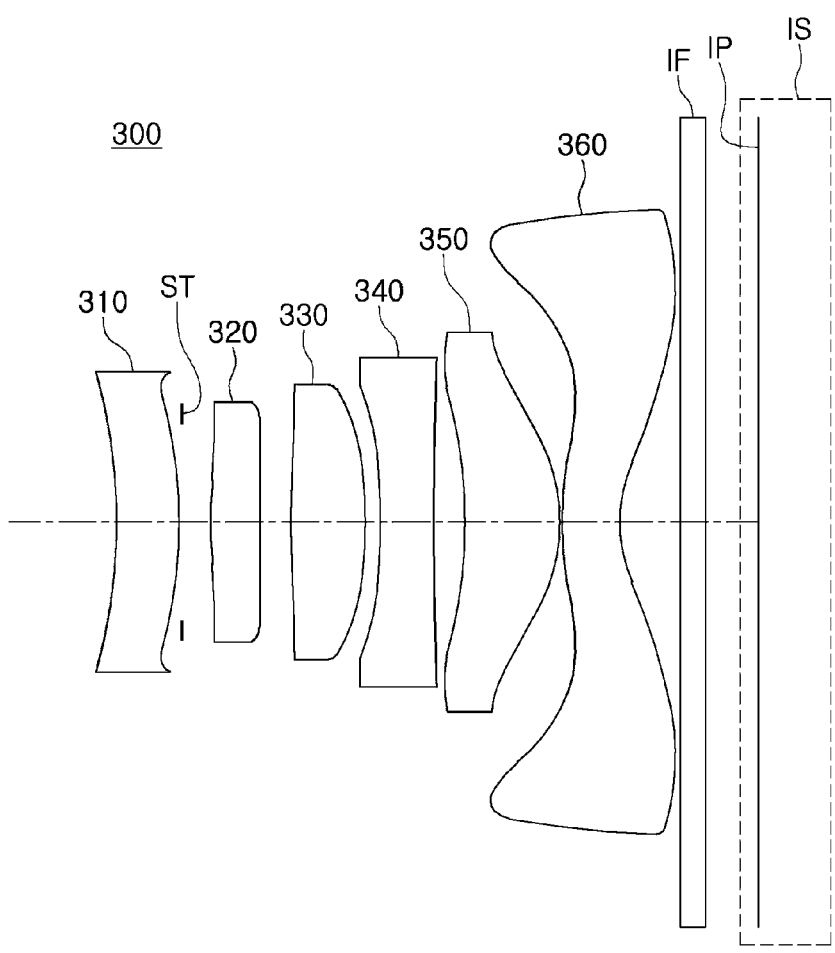
FIG. 5 is a configuration diagram illustrating an example optical imaging system according to a third example embodiment.

An example optical imaging system according to a third example embodiment will be described with reference to FIG. 5.

An example optical imaging system 300 may include a plurality of lenses sequentially disposed from an object side to an imaging side. For example, the optical imaging system 300 may include a first lens 310, a second lens 320, a third lens 330, a fourth lens 340, a fifth lens 350, and a sixth lens 360 sequentially disposed from the object side to the imaging side.

The first lens 310 may have positive refractive power, and may have a concave object-side surface and a convex image-side surface. The second lens 320 may have negative refractive power, and may have a convex object-side surface and a concave image-side surface. The third lens 330 may have positive refractive power, and may have a convex object-side surface and a convex image-side surface. The fourth lens 340 may have negative refractive power, and may have a concave object-side surface and a concave image-side surface. The fifth lens 350 may have positive refractive power, and may have a concave object-side surface and a convex image-side surface. The sixth lens 360 may have negative refractive power, and may have a convex object-side surface and a concave image-side surface. The sixth lens 360 may have an inflection point. For example, the object-side surface and the image-side surface of the sixth lens 360 may have an inflection point.

The example optical imaging system 300 may further include other optical elements in addition to the first lens 310 to the sixth lens 360. For example, the optical imaging system 300 may further include an aperture ST and a filter IF.

The aperture ST may be disposed between the first lens 310 and the second lens 320, and the filter IF may be disposed between the sixth lens 360 and an image plane IP. In an example, the filter IF may be omitted, as necessary. The image plane IP may be formed in a position in which light incident through the first lens 310 to the sixth lens 360 forms an image. For example, the image plane IP may be formed on a surface of an image sensor IS of a camera module or may be formed on an inside of the image sensor IS.

Figure 6:
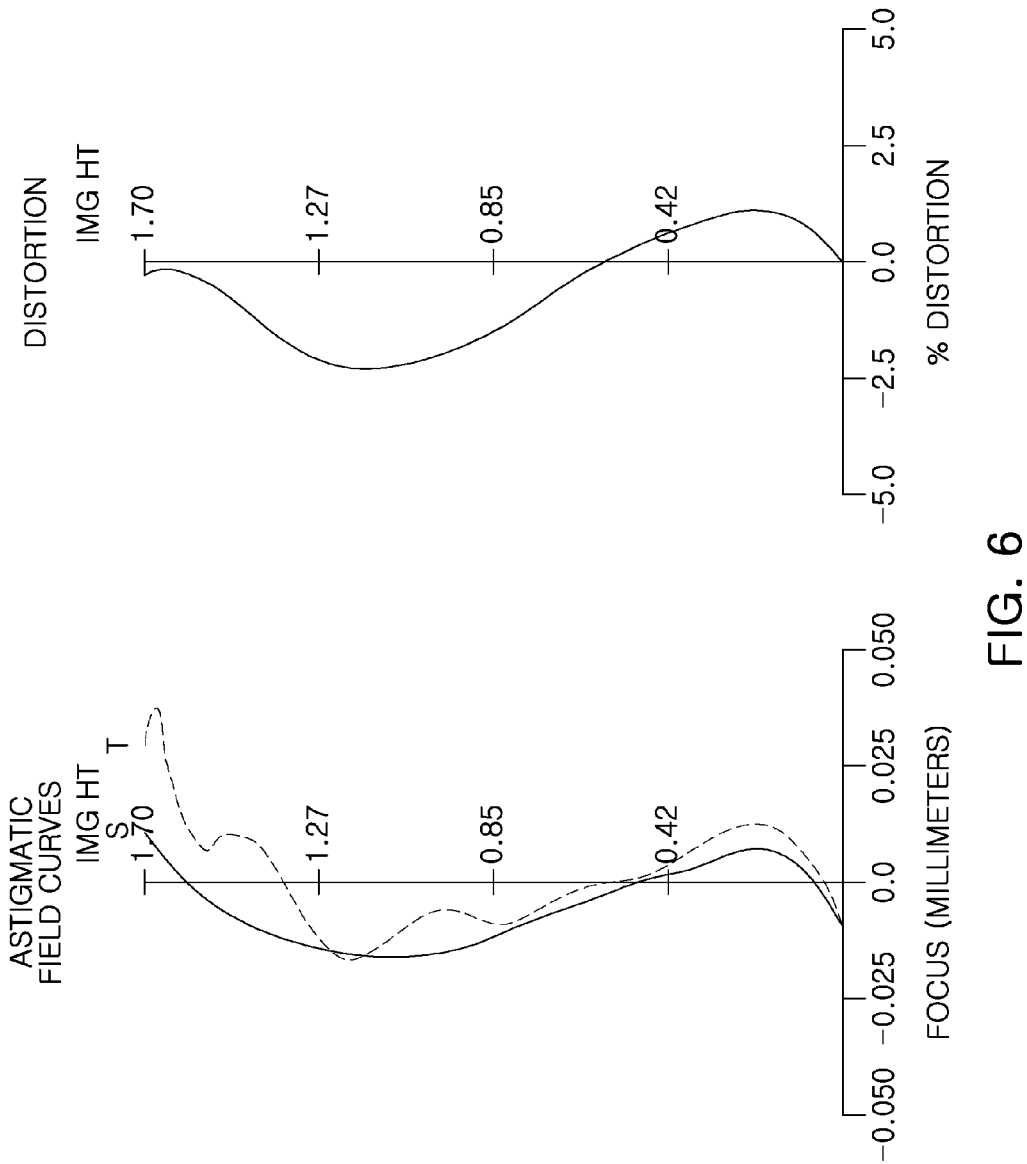
FIG. 6 is an aberration curve of the example optical imaging system illustrated in FIG. 5.

FIG. 6 illustrates aberration properties of the optical imaging system 300 according to the present example embodiment. Tables 5 and 6 below illustrate lens properties and a distance between lens groups of the optical imaging system according to the present example embodiment.

TABLE 5

| Surface No | Component | Radius of Curvature | Thickness/ Distance | Refractive Index | Abbe Number | Maximum Diameter | DTn |
|---|---|---|---|---|---|---|---|
| S0 | Object | Infinity | 1500 | | | | |
| S1 | | Infinity | 0.0978 | | | | |
| S2 | First lens | −1.4642 | 0.2860 | 1.541 | 56.0 | 1.271 | −94.643 |
| S3 | | −1.1839 | 0.0100 | | | | |
| S4 | Aperture | Infinity | 0.1291 | | | | |
| S5 | Second lens | 2.0287 | 0.1916 | 1.497 | 81.6 | 0.946 | −6.560 |
| S6 | | 1.7799 | 0.1379 | | | | |
| S7 | Third lens | 2.4056 | 0.3521 | 1.541 | 56.0 | 1.104 | −94.643 |
| S8 | | −1.2384 | 0.0627 | | | | |
| S9 | Fourth lens | −4.0666 | 0.1923 | 1.651 | 21.5 | 1.378 | −110.976 |
| S10 | | 1.6480 | 0.1450 | | | | |
| S11 | Fifth lens | −1.7944 | 0.4406 | 1.541 | 56.0 | 1.533 | −94.643 |
| S12 | | −0.4466 | 0.0100 | | | | |
| S13 | Sixth lens | 0.7545 | 0.2453 | 1.541 | 56.0 | 2.744 | −94.643 |
| S14 | | 0.3449 | 0.2876 | | | | |
| S15 | Filter | Infinity | 0.1500 | 1.517 | 64.2 | | |
| S16 | | Infinity | 0.1481 | | | | |
| S17 | Image plane | Infinity | 0.2109 | | | | |

TABLE 6

| Surface No. | S2 | S3 | S5 | S6 | S7 | S8 |
|---|---|---|---|---|---|---|
| K | −1.0017E+01 | −5.8337E−01 | −1.6305E+01 | −3.5712E+01 | −4.0352E+01 | −2.0748E+01 |
| A | 9.1214E−02 | 8.9351E−01 | 5.3947E−03 | −6.0404E−01 | 1.5133E−01 | −5.5867E−01 |
| B | −5.9292E−01 | −3.4914E+00 | −1.3203E+01 | −8.2994E+00 | −4.4688E+00 | −3.1733E+00 |
| C | 9.8160E+00 | 1.8832E+01 | 3.3289E+02 | 1.1960E+02 | 2.3242E+01 | 3.1270E+01 |
| D | −9.9786E+01 | −1.6377E+02 | −7.1256E+03 | −1.6742E+03 | −1.4592E+02 | −1.6536E+02 |
| E | 5.8396E+02 | 1.3703E+03 | 9.6349E+04 | 1.5321E+04 | 6.3076E+02 | 4.9719E+02 |
| F | −2.0719E+03 | −7.7063E+03 | −8.0567E+05 | −8.3861E+04 | −1.2710E+03 | −8.4899E+02 |
| G | 4.4063E+03 | 2.6126E+04 | 4.0342E+06 | 2.6624E+05 | 9.6039E+02 | 6.3832E+02 |

TABLE 6-continued

| H | −5.1828E+03 | −4.8897E+04 | 0 | −4.3505E+05 | 0 | 0 |
| J | 2.6060E+03 | 3.9565E+04 | 0 | 2.6784E+05 | 0 | 0 |

| Surface No. | S9 | S10 | S11 | S12 | S13 | S14 |
|---|---|---|---|---|---|---|
| K | −1.2090E+02 | −7.7097E+00 | −1.1077E+01 | −1.0758E+00 | −1.9187E+01 | −4.1160E+00 |
| A | −6.3836E−01 | −1.1319E+00 | −3.5489E−01 | 1.2896E+00 | 1.1220E+00 | −9.7053E−02 |
| B | −6.5470E+00 | 5.2563E+00 | 1.8327E+00 | 2.4757E+00 | −7.0792E+00 | −1.0704E+00 |
| C | 5.9158E+01 | −3.3282E+01 | 2.4956E+00 | −7.7854E+01 | 2.0168E+01 | 3.2695E+00 |
| D | −2.6260E+02 | 1.5460E+02 | −1.4733E+02 | 5.4508E+02 | −3.4944E+01 | −4.9656E+00 |
| E | 8.6871E+02 | −4.3377E+02 | 8.8762E+02 | −2.1238E+03 | 3.8934E+01 | 4.5100E+00 |
| F | −2.2279E+03 | 7.1466E+02 | −2.3895E+03 | 5.0246E+03 | −2.8084E+03 | −2.5601E+00 |
| G | 3.6375E+03 | −6.1226E+02 | 3.4087E+03 | −7.0126E+03 | 1.2670E+01 | 8.9580E−01 |
| H | −2.5971E+03 | 1.9932E+02 | −2.5394E+03 | 5.2643E+03 | −3.2423E+00 | −1.7824E−01 |
| J | 0 | 0 | 7.8114E+02 | −1.6327E+03 | 3.5881E−01 | 1.5562E−02 |

Figure 7:
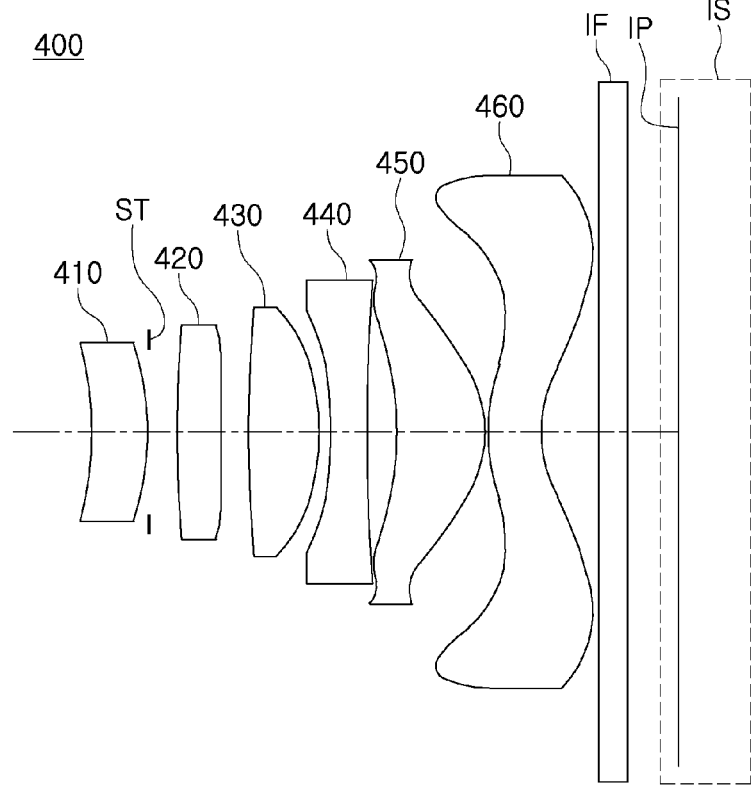
FIG. 7 is a configuration diagram illustrating an example optical imaging system according to a fourth example embodiment.

An example optical imaging system according to a fourth example embodiment will be described with reference to FIG. 7.

An example optical imaging system 400 may include a plurality of lenses sequentially disposed from an object side to an imaging side. For example, the optical imaging system 400 may include a first lens 410, a second lens 420, a third lens 430, a fourth lens 440, a fifth lens 450, and a sixth lens 460 sequentially disposed from the object side to the imaging side.

The first lens 410 may have positive refractive power, and may have a concave object-side surface and a convex image-side surface. The second lens 420 may have positive refractive power, and may have a convex object-side surface and a concave image-side surface. The third lens 430 may have positive refractive power, and may have a convex object-side surface and a convex image-side surface. The fourth lens 440 may have negative refractive power, and may have a concave object-side surface and a concave image-side surface. The fifth lens 450 may have positive refractive power, and may have a concave object-side surface and a convex image-side surface. The sixth lens 460 may have negative refractive power, and may have a convex object-side surface and a concave image-side surface. The sixth lens 460 may have an inflection point. For example, the object-side surface and the image-side surface of the sixth lens 460 may have an inflection point.

The optical imaging system 400 may further include other optical elements in addition to the first lens 410 to the sixth lens 460. For example, the optical imaging system 400 may further include an aperture ST and a filter IF.

The aperture ST may be disposed between the first lens 410 and the second lens 420, and the filter IF may be disposed between the sixth lens 460 and an image plane IP. In an example, the filter IF may be omitted, as necessary. The image plane IP may be formed in a position in which light incident through the first lens 410 to the sixth lens 460 forms an image. For example, the image plane IP may be formed on a surface of an image sensor IS of a camera module or may be formed on an inside of the image sensor IS.

Figure 8:
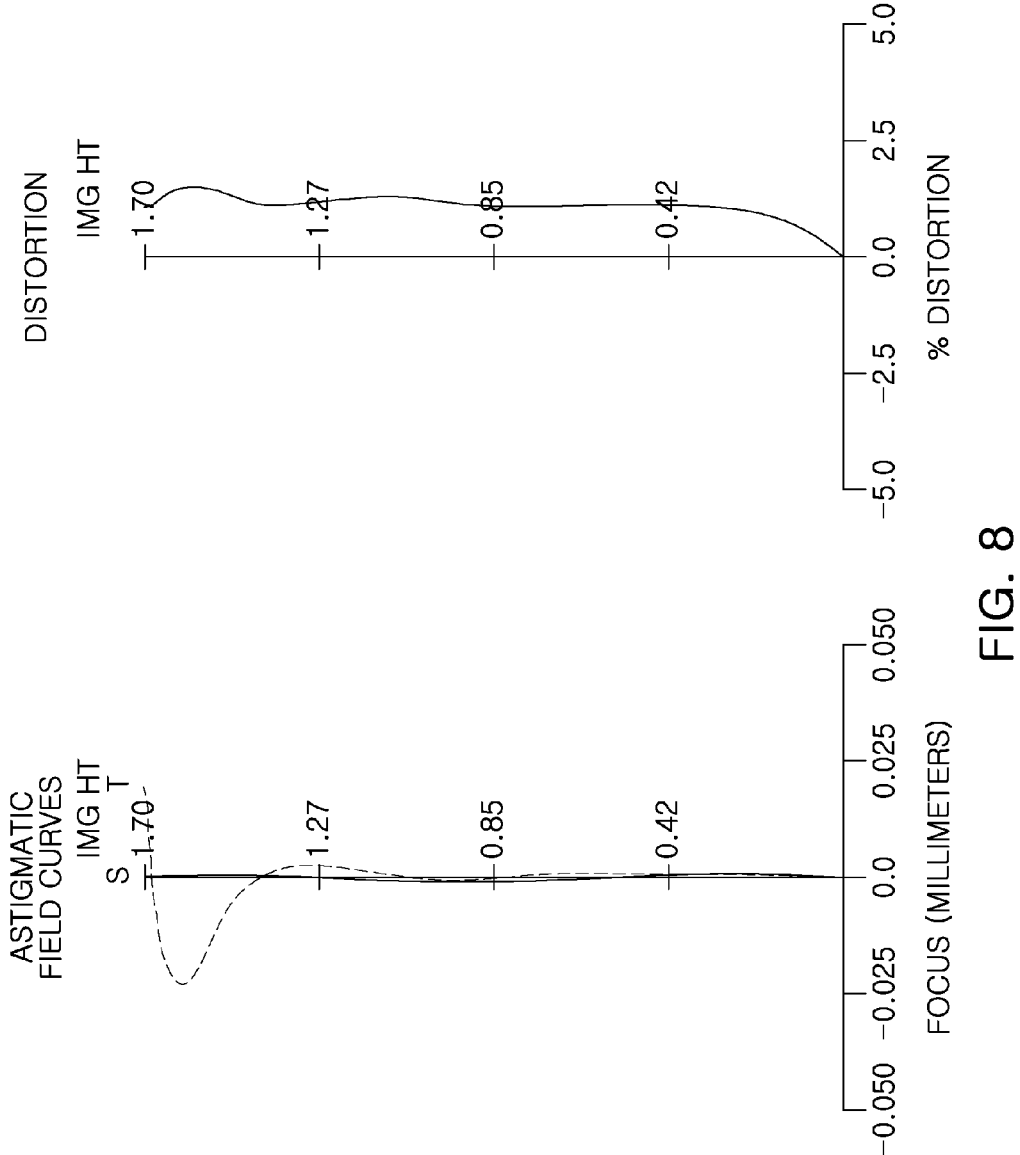
FIG. 8 is an aberration curve of the example optical imaging system illustrated in FIG. 7.

FIG. 8 illustrates aberration properties of the optical imaging system 400 according to the present example embodiment. Tables 7 and 8 below illustrate lens properties and a distance between lens groups of the optical imaging system according to the present example embodiment.

TABLE 7

| Surface No. | Component | Radius of Curvature | Thickness/ Distance | Refractive Index | Abbe Number | Maximum Diameter | DTn |
|---|---|---|---|---|---|---|---|
| S0 | Object | Infinity | 1500 | | | | |
| S1 | | Infinity | 0.0973 | | | | |
| S2 | First lens | −1.4788 | 0.2860 | 1.541 | 56.0 | 0.803 | −94.643 |
| S3 | | −1.1388 | 0.0100 | | | | |
| S4 | Aperture | Infinity | 0.1291 | | | | |
| S5 | Second lens | 2.0407 | 0.2091 | 1.497 | 81.6 | 0.960 | −6.560 |
| S6 | | 2.0347 | 0.1379 | | | | |
| S7 | Third lens | 2.0965 | 0.3521 | 1.541 | 56.0 | 1.104 | −94.643 |
| S8 | | −0.9897 | 0.0627 | | | | |
| S9 | Fourth lens | −1.9906 | 0.1709 | 1.651 | 21.5 | 1.348 | −110.976 |
| S10 | | 1.9246 | 0.1450 | | | | |
| S11 | Fifth lens | −1.6206 | 0.4406 | 1.541 | 56.0 | 1.517 | −94.643 |
| S12 | | −0.4688 | 0.0100 | | | | |
| S13 | Sixth lens | 0.7505 | 0.2453 | 1.541 | 56.0 | 2.649 | −94.643 |
| S14 | | 0.3378 | 0.2912 | | | | |
| S15 | Filter | Infinity | 0.1500 | 1.517 | 64.2 | | |
| S16 | | Infinity | 0.1480 | | | | |
| S17 | Image plane | Infinity | 0.1047 | | | | |

TABLE 8

| Surface No. | S2 | S3 | S5 | S6 | S7 | S8 |
|---|---|---|---|---|---|---|
| K | −9.0168E+00 | −4.9405E−01 | −1.4525E+01 | −4.2940E+01 | −3.5863E+01 | −1.6800E+01 |
| A | −3.6270E−02 | 8.3974E−01 | −6.8888E−03 | −7.0965E−01 | 2.0090E−01 | −5.5765E−01 |
| B | 3.4960E−01 | −7.3905E+00 | −1.0011E+01 | −9.1443E+00 | −5.0869E+00 | −4.6215E+00 |
| C | −1.1270E+00 | 1.3709E+02 | 2.4458E+02 | 1.5492E+02 | 3.1200E+01 | 5.2741E+01 |
| D | −2.2274E+00 | −1.7950E+03 | −5.2334E+03 | −2.2114E+03 | −2.0953E+02 | −3.0407E+02 |
| E | 2.9990E+01 | 1.3642E+04 | 6.9734E+04 | 2.0941E+04 | 8.6927E+02 | 8.8396E+02 |
| F | −9.8688E+01 | −5.4522E+04 | −5.6687E+05 | −1.2535E+05 | −1.6294E+03 | −1.2468E+03 |
| G | 1.6133E+02 | 7.6578E+04 | 2.7320E+06 | 4.6241E+05 | 1.0785E+03 | 6.7398E+02 |
| H | 0 | 0 | 0 | 0 | 0 | 0 |

| Surface No. | S9 | S10 | S11 | S12 | S13 | S14 |
|---|---|---|---|---|---|---|
| K | −7.4827E+01 | −4.7351E+00 | −1.0347E+01 | −1.0584E+00 | −1.5164E+01 | −3.6483E+00 |
| A | −7.5558E−01 | −1.1888E+00 | −4.9378E−01 | 1.1880E+00 | 4.5413E−01 | −3.9429E−01 |
| B | −6.0887E+00 | 6.8934E+00 | 4.2945E+00 | 1.6333E+00 | −4.4812E+00 | 1.0739E−01 |
| C | 5.2509E+01 | −4.9338E+01 | −4.8715E+00 | −5.4190E+01 | 1.2047E+01 | 2.1241E−02 |
| D | −1.4029E+02 | 2.4167E+02 | −1.7003E+02 | 3.7656E+02 | −2.1924E+01 | 8.4005E−01 |
| E | −4.2305E+01 | −7.1726E+02 | 1.0196E+03 | −1.4755E+03 | 3.2142E+01 | −2.2637E+00 |
| F | 9.3758E+02 | 1.2788E+03 | −2.5062E+03 | 3.4895E+03 | −3.6959E+01 | 2.5885E+00 |
| G | −1.6018E+03 | −1.2410E+03 | 3.1110E+03 | −4.8146E+03 | 2.8148E+01 | −1.5829E+00 |
| H | 0 | 0 | 0 | 0 | 0 | 0 |

Figure 9:
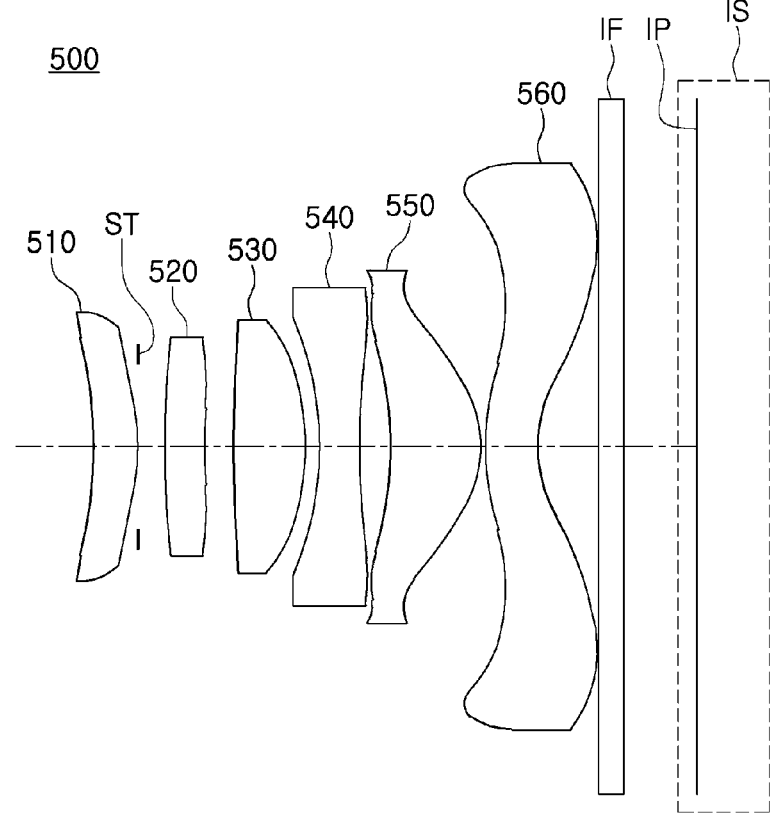
FIG. 9 is a configuration diagram illustrating an example optical imaging system according to a fifth example embodiment.

An example optical imaging system according to a fifth example embodiment will be described with reference to FIG. 9.

An example optical imaging system 500 may include a plurality of lenses sequentially disposed from an object side to an imaging side. For example, the optical imaging system 500 may include a first lens 510, a second lens 520, a third lens 530, a fourth lens 540, a fifth lens 550, and a sixth lens 560 sequentially disposed from the object side to the imaging side.

The first lens 510 may have positive refractive power, and may have a concave object-side surface and a convex image-side surface. The second lens 520 may have negative refractive power, and may have a convex object-side surface and a concave image-side surface. The third lens 530 may have positive refractive power, and may have a convex object-side surface and a convex image-side surface. The fourth lens 540 may have negative refractive power, and may have a concave object-side surface and a concave image-side surface. The fifth lens 550 may have positive refractive power, and may have a concave object-side surface and a convex image-side surface. The sixth lens 560 may have negative refractive power, and may have a convex object-side surface and a concave image-side surface. The sixth lens 560 may have an inflection point. For example, the object-side surface and the image-side surface of the sixth lens 560 may have an inflection point.

The example optical imaging system 500 may further include other optical elements in addition to the first lens 510 to the sixth lens 560. For example, the optical imaging system 500 may further include an aperture ST and a filter IF.

The aperture ST may be disposed between the first lens 510 and the second lens 520, and the filter IF may be disposed between the sixth lens 560 and an image plane IP. In an example, the filter IF may be omitted, as necessary. The image plane IP may be formed in a position in which light incident through the first lens 510 to the sixth lens 560 forms an image. For example, the image plane IP may be formed on a surface of an image sensor IS of a camera module or may be formed on an inside of the image sensor IS.

Figure 10:
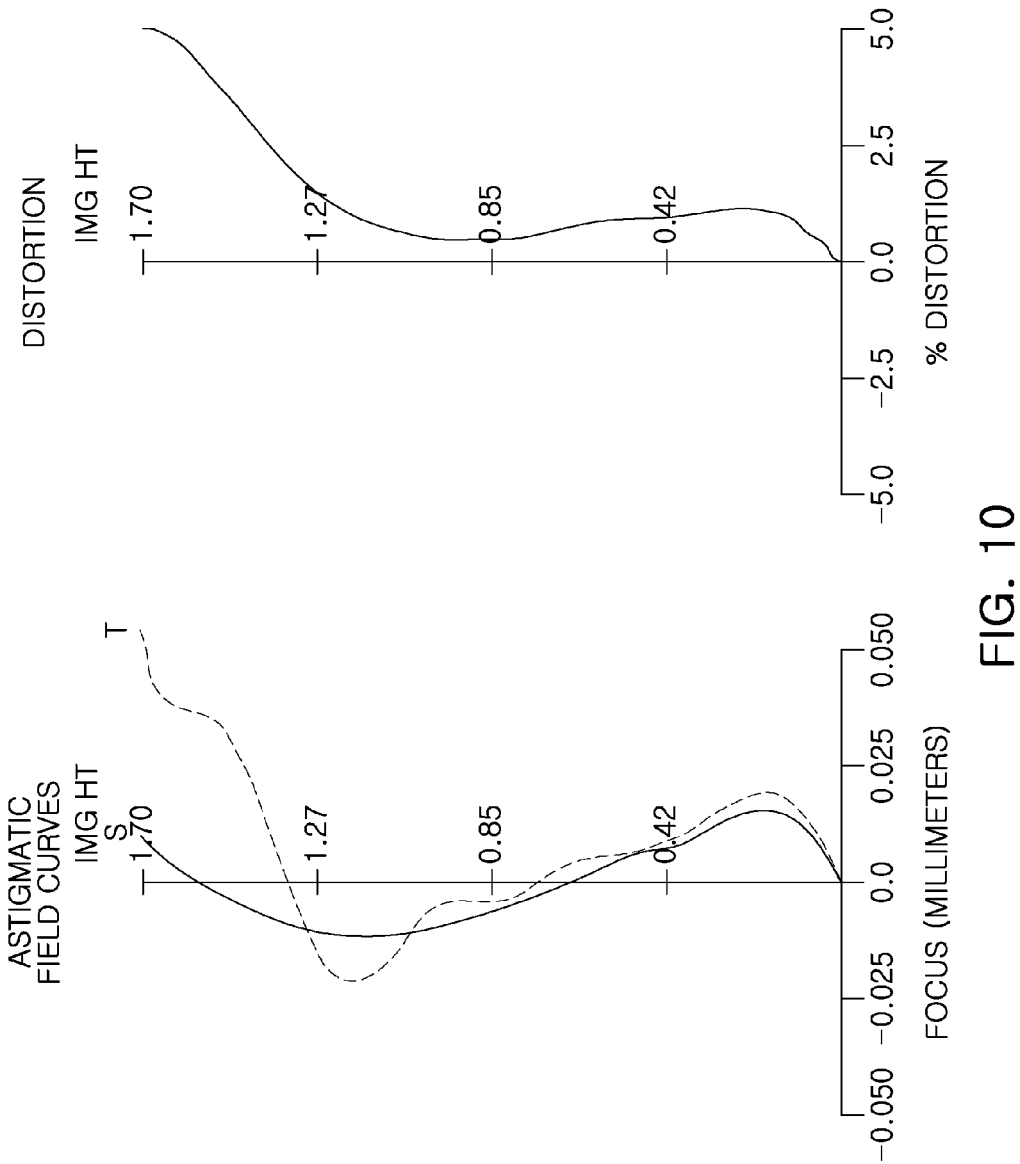
FIG. 10 is an aberration curve of the example optical imaging system illustrated in FIG. 9.

FIG. 10 illustrates aberration properties of the example optical imaging system 500 according to the present example embodiment. Tables 9 and 10 below illustrate lens properties and a distance between lens groups of the optical imaging system according to the present example embodiment.

TABLE 9

| Surface No. | Component | Radius of Curvature | Thickness/ Distance | Refractive Index | Abbe Number | Maximum Diameter | DTn |
|---|---|---|---|---|---|---|---|
| S0 | Object | Infinity | 1500 | | | | |
| S1 | | Infinity | 0.0963 | | | | |
| S2 | First lens | −1.4509 | 0.2000 | 1.541 | 56.0 | 1.179 | −94.643 |
| S3 | | −1.1820 | 0.0100 | | | | |
| S4 | Aperture | Infinity | 0.1291 | | | | |
| S5 | Second lens | 1.8903 | 0.1900 | 1.497 | 81.6 | 0.881 | −6.560 |
| S6 | | 1.7710 | 0.1379 | | | | |
| S7 | Third lens | 2.2912 | 0.3521 | 1.541 | 56.0 | 1.042 | −94.643 |
| S8 | | −1.1204 | 0.0627 | | | | |
| S9 | Fourth lens | −2.7200 | 0.1966 | 1.651 | 21.5 | 1.156 | −110.976 |
| S10 | | 1.6999 | 0.1550 | | | | |
| S11 | Fifth lens | −1.9065 | 0.4406 | 1.541 | 56.0 | 1.393 | −94.643 |
| S12 | | −0.5546 | 0.0100 | | | | |

TABLE 9-continued

| Surface No. | Component | Radius of Curvature | Thickness/ Distance | Refractive Index | Abbe Number | Maximum Diameter | DTn |
|---|---|---|---|---|---|---|---|
| S13 | Sixth lens | 0.7601 | 0.2553 | 1.541 | 56.0 | 2.530 | −94.643 |
| S14 | | 0.3430 | 0.3060 | | | | |
| S15 | Filter | Infinity | 0.1500 | 1.517 | 64.2 | | |
| S16 | | Infinity | 0.1480 | | | | |
| S17 | Image plane | Infinity | 0.1725 | | | | |

TABLE 10

| Surface No. | S2 | S3 | S5 | S6 | S7 | S8 |
|---|---|---|---|---|---|---|
| K | −1.0611E+01 | −6.0367E−01 | −1.9260E+01 | −3.8151E+01 | −3.4337E+01 | −1.8955E+01 |
| A | 1.5110E−01 | 8.4355E−01 | −3.5618E−02 | −6.1638E−01 | 1.8615E−01 | −5.6948E−01 |
| B | −9.1647E−01 | −1.1565E+00 | −1.3417E+01 | −7.8413E+00 | −5.1339E+00 | −4.2704E+00 |
| C | 1.5204E+01 | −3.1489E+01 | 3.5030E+02 | 1.0721E+02 | 3.6268E+01 | 4.9772E+01 |
| D | −1.8355E+02 | 5.1050E+02 | −7.4686E+03 | −1.5885E+03 | −2.5679E+02 | −2.9307E+02 |
| E | 1.2909E+03 | −4.4295E+03 | 9.9218E+04 | 1.5938E+04 | 1.1183E+03 | 9.3262E+02 |
| F | −5.4871E+03 | 2.4099E+04 | −8.1164E+05 | −9.8117E+04 | −2.3714E+03 | −1.5811E+03 |
| G | 1.3880E+04 | −8.1120E+04 | 3.9696E+06 | 3.6251E+05 | 1.9565E+03 | 1.1263E+03 |
| H | 0 | 0 | 0 | 0 | 0 | 0 |

| Surface No. | S9 | S10 | S11 | S12 | S13 | S14 |
|---|---|---|---|---|---|---|
| K | −8.1566E+01 | −6.9669E+00 | −1.1227E+01 | −1.0679E+00 | −1.8525E+01 | −3.9144E+00 |
| A | −6.1469E−01 | −1.1262E+00 | −3.2809E−01 | 1.2702E+00 | 1.0215E+00 | −1.2168E−01 |
| B | −8.8827E+00 | 5.1684E+00 | 1.8852E+00 | 2.2797E+00 | −6.8282E+00 | −8.3884E−01 |
| C | 8.9699E+01 | −3.2689E+01 | 1.6598E−01 | −7.2929E+01 | 1.9934E+01 | 2.5817E+00 |
| D | −4.6219E+02 | 1.5521E+02 | −1.1756E+02 | 5.0754E+02 | −3.6372E+01 | −3.8727E+00 |
| E | 1.6035E+03 | −4.5419E+02 | 6.9763E+02 | −1.9585E+03 | 4.3897E+01 | 3.4612E+00 |
| F | −3.7921E+03 | 7.9907E+02 | −1.7673E+03 | 4.5681E+03 | −3.5083E+01 | −1.9217E+00 |
| G | 5.5578E+03 | −7.5374E+02 | 2.3253E+03 | −6.2686E+03 | 1.7740E+01 | 6.4702E−01 |
| H | 0 | 0 | 0 | 0 | 0 | 0 |

Figure 11:
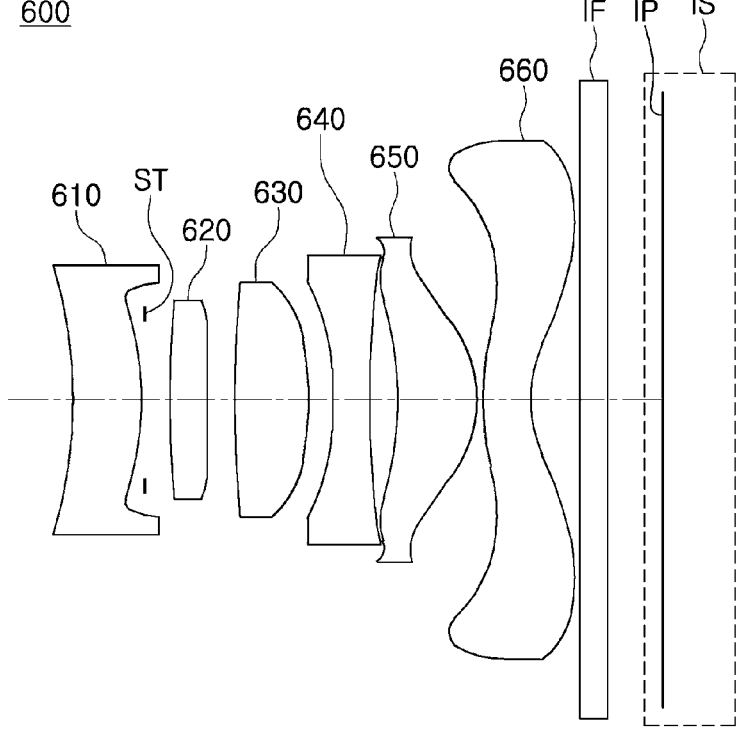
FIG. 11 is a configuration diagram illustrating an example optical imaging system according to a sixth example embodiment.

An example optical imaging system according to a sixth example embodiment will be described with reference to FIG. 11.

An example optical imaging system 600 may include a plurality of lenses sequentially disposed from an object side to an imaging side. For example, the optical imaging system 600 may include a first lens 610, a second lens 620, a third lens 630, a fourth lens 640, a fifth lens 650, and a sixth lens 660 sequentially disposed from the object side to the imaging side.

The first lens 610 may have positive refractive power, and may have a concave object-side surface and a convex image-side surface. The second lens 620 may have negative refractive power, and may have a convex object-side surface and a concave image-side surface. The third lens 630 may have positive refractive power, and may have a convex object-side surface and a convex image-side surface. The fourth lens 640 may have negative refractive power, and may have a concave object-side surface and a concave image-side surface. The fifth lens 650 may have positive refractive power, and may have a concave object-side surface and a convex image-side surface. The sixth lens 660 may have negative refractive power, and may have a convex object-side surface and a concave image-side surface. The sixth lens 660 may have an inflection point. For example, the object-side surface and the image-side surface of the sixth lens 660 may have an inflection point.

The example optical imaging system 600 may further include other optical elements in addition to the first lens 610 to the sixth lens 660. For example, the optical imaging system 600 may further include an aperture ST and a filter IF.

The aperture ST may be disposed between the first lens 610 and the second lens 620, and the filter IF may be disposed between the sixth lens 660 and an image plane IP. In an example, the filter IF may be omitted, as necessary. The image plane IP may be formed in a position in which light incident through the first lens 610 to the sixth lens 660 forms an image. For example, the image plane IP may be formed on a surface of an image sensor IS of a camera module or may be formed on an inside of the image sensor IS.

Figure 12:
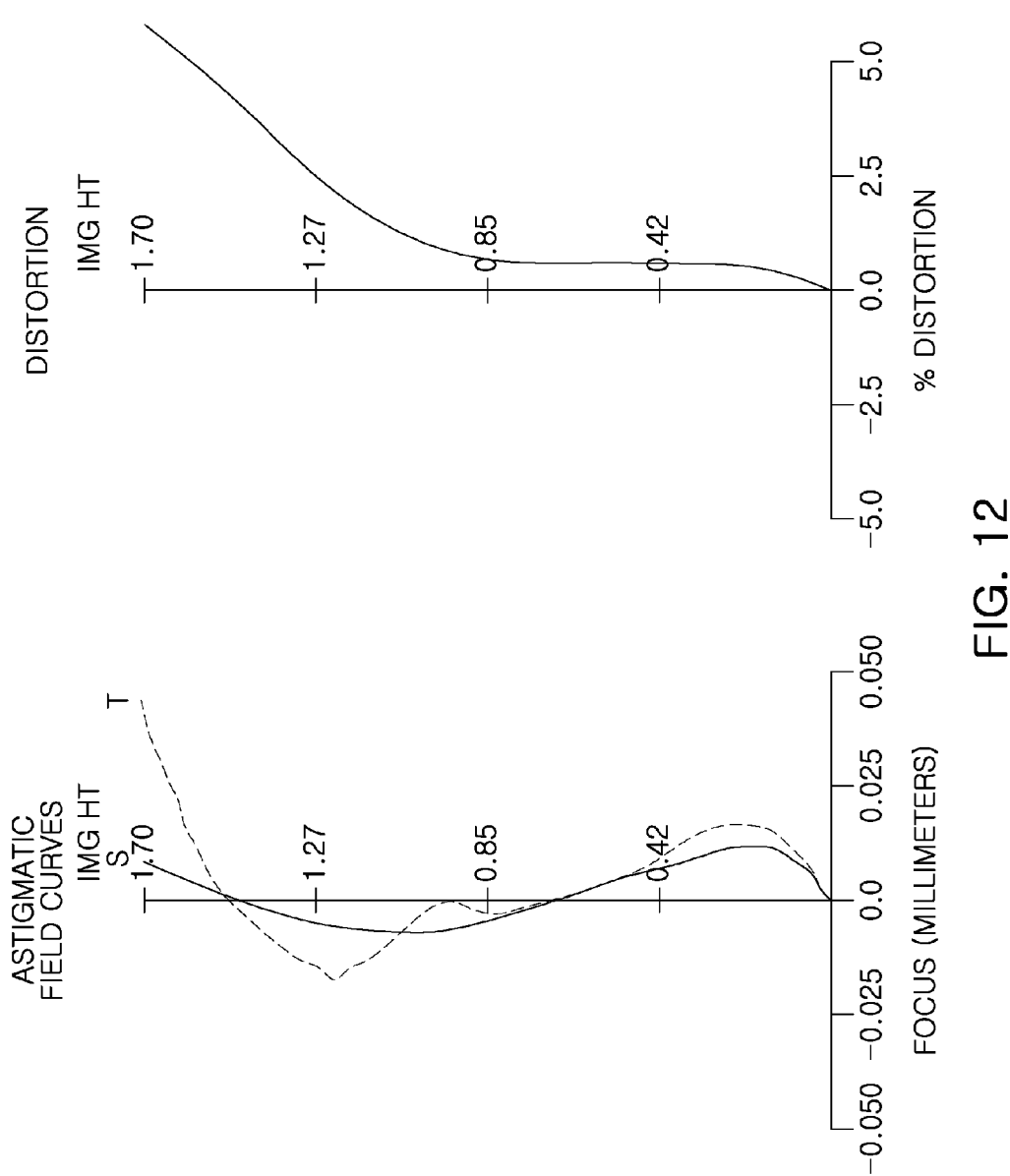
FIG. 12 is an aberration curve of the example optical imaging system illustrated in FIG. 11.

FIG. 12 illustrates aberration properties of the example optical imaging system 600 according to the present example embodiment. Tables 11 and 12 below illustrate lens properties and a distance between lens groups of the optical imaging system according to the present example embodiment.

TABLE 11

| Surface No. | Component | Radius of Curvature | Thickness/ Distance | Refractive Index | Abbe Number | Maximum Diameter | DTn |
|---|---|---|---|---|---|---|---|
| S0 | Object | Infinity | 1500 | | | | |
| S1 | | Infinity | 0.0981 | | | | |
| S2 | First lens | −1.4774 | 0.3500 | 1.541 | 56.0 | 1.262 | −94.643 |
| S3 | | −1.1993 | 0.0100 | | | | |
| S4 | Aperture | Infinity | 0.1430 | | | | |
| S5 | Second lens | 2.0205 | 0.1850 | 1.497 | 81.6 | 0.947 | −6.560 |
| S6 | | 1.8437 | 0.1481 | | | | |
| S7 | Third lens | 2.1953 | 0.4029 | 1.541 | 56.0 | 1.104 | −94.643 |
| S8 | | −1.2007 | 0.1175 | | | | |
| S9 | Fourth lens | −2.9936 | 0.1911 | 1.651 | 21.5 | 1.372 | −110.976 |
| S10 | | 1.6365 | 0.1558 | | | | |
| S11 | Fifth lens | −2.2640 | 0.4311 | 1.541 | 56.0 | 1.533 | −94.643 |
| S12 | | −0.4663 | 0.0135 | | | | |
| S13 | Sixth lens | 0.7957 | 0.2404 | 1.541 | 56.0 | 2.661 | −94.643 |
| S14 | | 0.3517 | 0.2798 | | | | |
| S15 | Filter | Infinity | 0.1500 | 1.517 | 64.2 | | |
| S16 | | Infinity | 0.1480 | | | | |
| S17 | Image plane | Infinity | 0.1313 | | | | |

TABLE 12

| Surface No | S2 | S3 | S5 | S6 | S7 | S8 |
|---|---|---|---|---|---|---|
| K | −1.0043E+01 | −6.8418E−01 | −1.6297E+01 | −3.9826E+01 | −3.4137E+01 | −1.7469E+01 |
| A | 5.9719E−02 | 8.3559E−01 | −2.2088E−02 | −6.6638E−01 | 1.4292E−01 | −7.5037E−01 |
| B | −6.2435E−01 | −2.6908E+00 | −1.1935E+01 | −6.8486E+00 | −4.0555E+00 | −5.0153E−01 |
| C | 1.1302E+01 | 1.5601E+01 | 3.0720E+02 | 8.8652E+01 | 2.0710E+01 | 1.2903E+01 |
| D | −1.0687E+02 | −2.4339E+02 | −6.5736E+03 | −1.3312E+03 | −1.1735E+02 | −8.9788E+01 |
| E | 5.9796E+02 | 3.1841E+03 | 8.6656E+04 | 1.3806E+04 | 4.3530E+02 | 2.6461E+02 |
| F | −2.0671E+03 | −2.4335E+04 | −6.9716E+05 | −8.7728E+04 | −7.0104E+02 | −3.6351E+02 |
| G | 0 | 0 | 0 | 0 | 0 | 0 |
| H | 0 | 0 | 0 | 0 | 0 | 0 |

| Surface No. | S9 | S10 | S11 | S12 | S13 | S14 |
|---|---|---|---|---|---|---|
| K | −6.9383E+01 | −6.5889E+00 | −1.1321E+01 | −1.0799E+00 | −1.9179E+01 | −3.9541E+00 |
| A | −8.8836E−01 | −1.1275E+00 | −3.3902E−01 | 1.1721E+00 | 5.3205E−01 | −4.1150E−01 |
| B | −3.5178E+00 | 5.1126E+00 | 2.2747E+00 | 1.9618E+00 | −4.7957E+00 | 7.1990E−02 |
| C | 3.8532E+01 | −3.1201E+01 | −2.1987E+00 | −6.1826E+01 | 1.4082E+01 | 6.2318E−01 |
| D | −1.6371E+02 | 1.4138E+02 | −1.0236E+02 | 4.3335E+02 | −2.4729E+01 | −9.8405E−01 |
| E | 4.8217E+02 | −3.8596E+02 | 6.0621E+02 | −1.6921E+03 | 2.8375E+01 | 5.7388E−01 |
| F | −1.2063E+03 | 6.1211E+02 | −1.4616E+03 | 3.9883E+03 | −2.1774E+01 | 4.2759E−03 |
| G | 0 | 0 | 0 | 0 | 0 | 0 |
| H | 0 | 0 | 0 | 0 | 0 | 0 |

Figure 13:
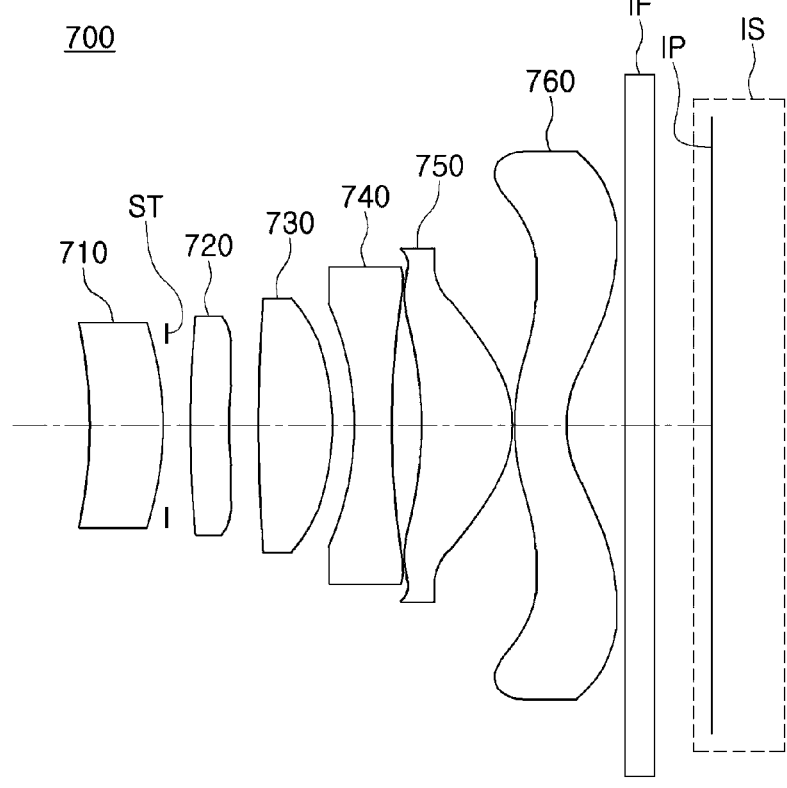
FIG. 13 is a configuration diagram illustrating an example optical imaging system according to a seventh example embodiment.

An example optical imaging system according to a seventh example embodiment will be described with reference to FIG. 13.

An optical imaging system 700 may include a plurality of lenses sequentially disposed from an object side to an imaging side. For example, the optical imaging system 700 may include a first lens 710, a second lens 720, a third lens 730, a fourth lens 740, a fifth lens 750, and a sixth lens 760 sequentially disposed from the object side to the imaging side.

The first lens 710 may have positive refractive power, and may have a concave object-side surface and a convex image-side surface. The second lens 720 may have negative refractive power, and may have a convex object-side surface and a concave image-side surface. The third lens 730 may have positive refractive power, and may have a convex object-side surface and a convex image-side surface. The fourth lens 740 may have negative refractive power, and may have a concave object-side surface and a concave image-side surface. The fifth lens 750 may have positive refractive power, and may have a concave object-side surface and a convex image-side surface. The sixth lens 760 may have negative refractive power, and may have a convex object-side surface and a concave image-side surface. The sixth lens 760 may have an inflection point. For example, the object-side surface and the image-side surface of the sixth lens 760 may have an inflection point.

The optical imaging system 700 may further include other optical elements in addition to the first lens 710 to the sixth lens 760. For example, the optical imaging system 700 may further include an aperture ST and a filter IF.

The aperture ST may be disposed between the first lens 710 and the second lens 720, and the filter IF may be disposed between the sixth lens 760 and an image plane IP. In an example, the filter IF may be omitted, as necessary. The image plane IP may be formed in a position in which light incident through the first lens 710 to the sixth lens 760 forms an image. For example, the image plane IP may be formed on a surface of an image sensor IS of a camera module or may be formed on an inside of the image sensor IS.

Figure 14:
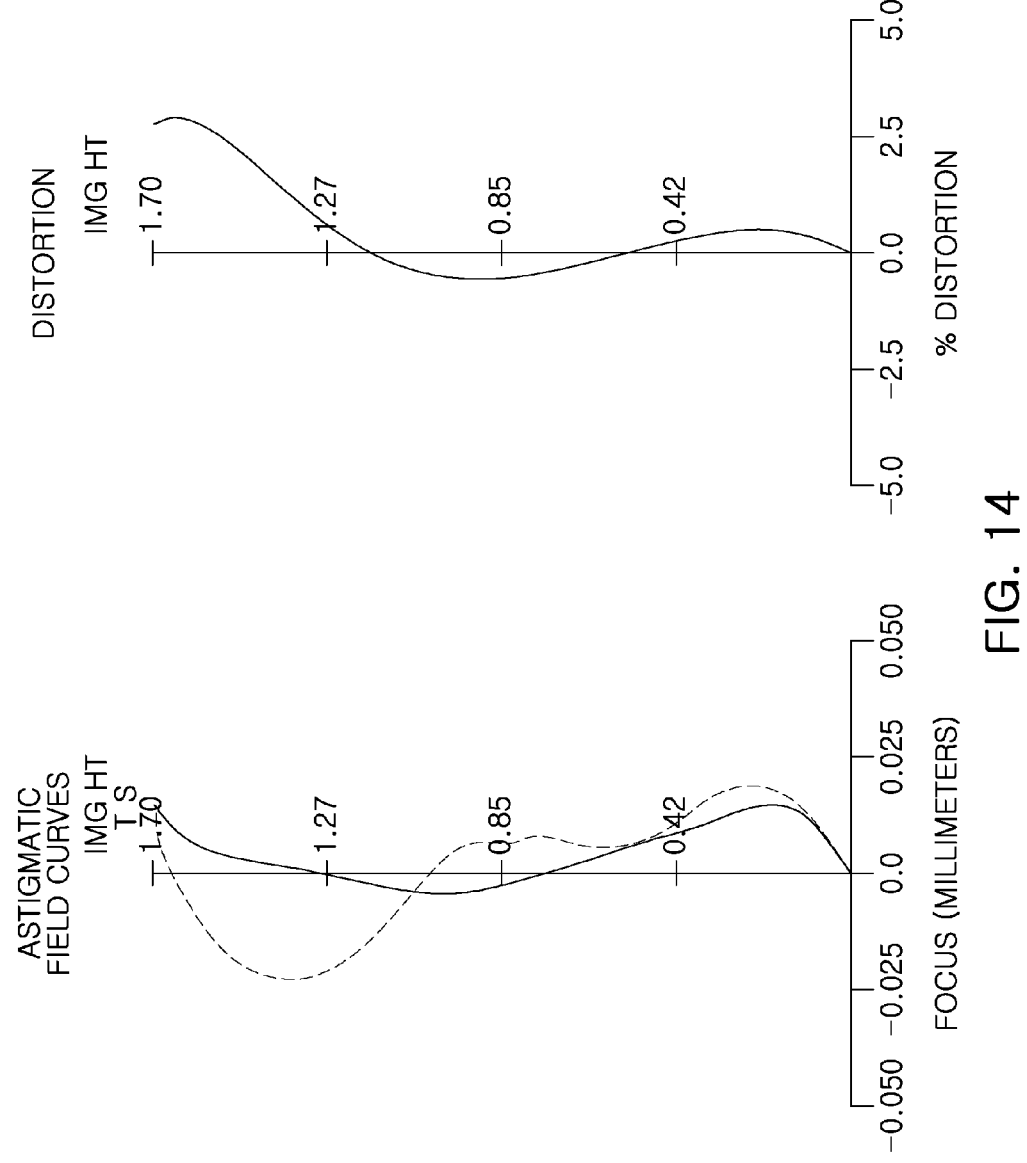
FIG. 14 is an aberration curve of the example optical imaging system illustrated in FIG. 13.

FIG. 14 illustrates aberration properties of the optical imaging system 700 according to the present example embodiment. Tables 13 and 14 below illustrate lens properties and a distance between lens groups of the optical imaging system according to the present example embodiment.

TABLE 13

| Surface No. | Component | Radius of Curvature | Thickness/ Distance | Refractive Index | Abbe Number | Maximum Diameter | DTn |
|---|---|---|---|---|---|---|---|
| S0 | Object | Infinity | 1500 | | | | |
| S1 | | Infinity | 0.0989 | | | | |
| S2 | First lens | −1.4695 | 0.4000 | 1.541 | 56.0 | 0.880 | −94.643 |
| S3 | | −1.2004 | 0.0130 | | | | |
| S4 | Aperture | Infinity | 0.1255 | | | | |
| S5 | Second lens | 1.9312 | 0.1870 | 1.497 | 81.6 | 0.946 | −6.560 |
| S6 | | 1.6384 | 0.1405 | | | | |
| S7 | Third lens | 2.1062 | 0.3663 | 1.541 | 56.0 | 1.104 | −94.643 |
| S8 | | −1.0462 | 0.1015 | | | | |
| S9 | Fourth lens | −2.3710 | 0.1870 | 1.651 | 21.5 | 1.388 | −110.976 |
| S10 | | 1.4611 | 0.1559 | | | | |
| S11 | Fifth lens | −2.3311 | 0.4407 | 1.541 | 56.0 | 1.537 | −94.643 |
| S12 | | −0.5518 | 0.0163 | | | | |
| S13 | Sixth lens | 0.7704 | 0.2471 | 1.541 | 56.0 | 2.672 | −94.643 |
| S14 | | 0.3489 | 0.2798 | | | | |
| S15 | Filter | Infinity | 0.1500 | 1.517 | 64.2 | | |
| S16 | | Infinity | 0.1480 | | | | |
| S17 | Image plane | Infinity | 0.1311 | | | | |

TABLE 14

| Surface No. | S2 | S3 | S5 | S6 | S7 | S8 |
|---|---|---|---|---|---|---|
| K | −1.0067E+01 | −6.4616E−01 | −1.8284E+01 | −3.8233E+01 | −3.3197E+01 | −1.8550E+01 |
| A | 8.1521E−02 | 9.1778E−01 | −2.3669E−01 | −5.7089E−01 | 2.6294E−01 | −6.9029E−01 |
| B | −9.9540E−01 | −4.4834E+00 | 6.9178E+00 | −7.5096E+00 | −6.5926E+00 | −1.5713E+00 |
| C | 1.6885E+01 | 4.5813E+01 | −4.7659E+02 | 6.1362E+01 | 5.1065E+01 | 2.4619E+01 |
| D | −1.6073E+02 | −6.4168E+02 | 1.1346E+04 | −5.7413E+02 | −3.6691E+02 | −1.7598E+02 |
| E | 8.9506E+02 | 6.9700E+03 | −1.5821E+05 | 3.4485E+03 | 1.6657E+03 | 6.5508E+02 |
| F | −3.0179E+03 | −4.9191E+04 | 1.3482E+06 | −1.7879E+03 | −3.8610E+03 | −1.2820E+03 |
| G | 0 | 0 | 0 | 0 | 0 | 0 |
| H | 0 | 0 | 0 | 0 | 0 | 0 |

| Surface No. | S9 | S10 | S11 | S12 | S13 | S14 |
|---|---|---|---|---|---|---|
| K | −7.8290E+01 | −6.9847E+00 | −1.1467E+01 | −1.0709E+00 | −2.0182E+01 | −4.1728E+00 |
| A | −6.2761E−01 | −1.0854E+00 | −3.3468E−01 | 1.2461E+00 | 1.1267E+00 | −1.3119E−01 |
| B | −8.3438E+00 | 3.9364E+00 | 2.0360E+00 | 3.0905E+00 | −7.6194E+00 | −1.2682E+00 |
| C | 8.4335E+01 | −1.9593E+01 | −5.7193E−01 | −8.3751E+01 | 2.2266E+01 | 3.9717E+00 |
| D | −4.4919E+02 | 8.0820E+01 | −1.1197E+02 | 5.8156E+02 | −3.9726E+01 | −6.0847E+00 |
| E | 1.6484E+03 | −2.0179E+02 | 6.6214E+02 | −2.2552E+03 | 4.6366E+01 | 5.5204E+00 |
| F | −4.0755E+03 | 2.8744E+02 | −1.6558E+03 | 5.2853E+03 | −3.6084E+01 | −3.1087E+00 |
| G | 0 | 0 | 0 | 0 | 0 | 0 |
| H | 0 | 0 | 0 | 0 | 0 | 0 |

Table 15 illustrates property values of the example optical imaging systems according to the first to seventh example embodiments.

TABLE 15

| Note | First Example Embodiment | Second Example Embodiment | Third Example Embodiment | Fourth Example Embodiment | Fifth Example Embodiment | Sixth Example Embodiment | Seventh Example Embodiment |
|---|---|---|---|---|---|---|---|
| f number | 1.890 | 1.890 | 1.890 | 1.890 | 1.890 | 1.890 | 1.890 |
| ImgHT | 1.695 | 1.695 | 1.695 | 1.695 | 1.695 | 1.695 | 1.695 |
| FOV | 98.860 | 98.480 | 99.040 | 94.380 | 94.660 | 91.880 | 97.720 |
| TLx | 3.068 | 3.062 | 3.097 | 2.990 | 2.992 | 3.186 | 3.178 |
| TTL | 2.972 | 2.986 | 2.999 | 2.893 | 2.896 | 3.088 | 3.079 |

TABLE 15-continued

| Note | First Example Embodiment | Second Example Embodiment | Third Example Embodiment | Fourth Example Embodiment | Fifth Example Embodiment | Sixth Example Embodiment | Seventh Example Embodiment |
|---|---|---|---|---|---|---|---|
| BFL | 0.778 | 0.850 | 0.797 | 0.694 | 0.776 | 0.709 | 0.709 |
| f | 1.4449 | 1.4447 | 1.4446 | 1.4620 | 1.4885 | 1.4700 | 1.4000 |
| f1 | 8.8354 | 27.0838 | 8.3193 | 6.9854 | 9.2411 | 8.0701 | 8.2168 |
| f2 | −37.5297 | −25.8322 | −39.1369 | 131.1072 | −119.7699 | −64.8589 | −27.5177 |
| f3 | 1.3433 | 1.3879 | 1.5488 | 1.2819 | 1.4290 | 1.4824 | 1.3338 |
| f4 | −1.4398 | −1.6315 | −1.7604 | −1.4903 | −1.5927 | −1.6129 | −1.3741 |
| f5 | 0.9580 | 0.9805 | 0.9755 | 1.0633 | 0.9865 | 0.9906 | 0.9471 |
| f6 | −1.5565 | −1.5780 | −1.4750 | −1.4232 | −1.4436 | −1.4263 | −1.4718 |

Tables 16 and 17 below illustrate conditional expression values of the example optical imaging systems according to the first to seventh example embodiments.

TABLE 16

| Conditional Expression | First Example Embodiment | Second Example Embodiment | Third Example Embodiment | Fourth Example Embodiment |
|---|---|---|---|---|
| f1/f | 6.1149 | 18.7470 | 5.7589 | 4.7780 |
| f2/f | −25.9739 | −17.8806 | −27.0919 | 89.6766 |
| V1 − V2 | −25.5600 | 32.5000 | −25.5600 | −25.5600 |
| TLx/f | 2.1235 | 2.1194 | 2.1438 | 2.0550 |
| L1TR/L2TR | 1.3310 | 1.2594 | 1.3430 | 0.8366 |
| \|f1/f2\| | 0.2354 | 1.0485 | 0.2126 | 0.0533 |
| f1/f2 | −0.2354 | −1.0485 | −0.2126 | 0.0533 |
| BFL/f | 0.2689 | 0.3176 | 0.2485 | 0.1728 |
| D12/f | 0.0963 | 0.0963 | 0.0963 | 0.0951 |
| D23/f | 0.0954 | 0.0955 | 0.0955 | 0.0943 |
| BFL/TLx | 0.5386 | 0.5884 | 0.5514 | 0.4746 |

| Conditional Expression | Fifth Example Embodiment | Sixth Example Embodiment | Seventh Example Embodiment |
|---|---|---|---|
| f1/f | 6.2083 | 5.4899 | 5.8692 |
| f2/f | −80.4635 | −44.1217 | −19.6555 |
| V1 − V2 | −25.5600 | −25.5600 | −25.5600 |
| TLx/f | 2.0101 | 2.1671 | 2.2698 |
| L1TR/L2TR | 1.3389 | 1.3327 | 0.9296 |
| \|f1/f2\| | 0.0772 | 0.1244 | 0.2986 |
| f1/f2 | −0.0772 | −0.1244 | −0.2986 |
| BFL/f | 0.5216 | 0.4824 | 0.5063 |
| D12/f | 0.0934 | 0.1041 | 0.0982 |
| D23/f | 0.0926 | 0.1007 | 0.1004 |
| BFL/TLx | 0.2595 | 0.2226 | 0.2231 |

TABLE 17

| Conditional Expression | First Example Embodiment | Second Example Embodiment | Third Example Embodiment | Fourth Example Embodiment |
|---|---|---|---|---|
| TTL/f | 2.0569 | 2.0669 | 2.0761 | 1.9785 |
| TTL/ImgHT | 1.7533 | 1.7616 | 1.7693 | 1.7064 |
| (R1 − R2)/(R1 + R2) | 0.0984 | 0.0162 | 0.1058 | 0.1299 |
| f3/ImgHT | 0.7925 | 0.8188 | 0.9137 | 0.7562 |
| f3/f4 | −0.9329 | −0.8507 | −0.8798 | −0.8602 |
| f3/f6 | −0.9223 | −0.8795 | −1.0500 | −0.9007 |
| f4/f6 | 0.9886 | 1.0339 | 1.1935 | 1.0471 |
| (R5 + R6)/f3 | 0.8768 | −0.0177 | 0.7536 | 0.8634 |
| (R7 + R8)/f4 | 0.5091 | 0.4771 | 1.3739 | 0.0443 |
| (R9 + R10)/f5 | −2.5355 | −2.6163 | −2.2975 | −1.9650 |
| (R11 + R12)/f6 | −0.7755 | −0.7207 | −0.7553 | −0.7647 |
| DTn1/DTn2 | 14.4273 | 14.4273 | 14.4273 | 14.4273 |
| (DTn1 + DTn3)/(DTn2 + DTn4) | 1.6105 | 1.6105 | 1.6105 | 1.6105 |

TABLE 17-continued

| Conditional Expression | Fifth Example Embodiment | Sixth Example Embodiment | Seventh Example Embodiment |
|---|---|---|---|
| TTL/f | 1.9554 | 2.1003 | 2.1991 |
| TTL/ImgHT | 1.7083 | 1.8214 | 1.8162 |
| (R1 − R2)/(R1 + R2) | 0.1021 | 0.1039 | 0.1008 |
| f3/ImgHT | 0.8430 | 0.8755 | 0.7868 |
| f3/f4 | −0.8972 | −0.9191 | −0.9707 |
| f3/f6 | −0.9898 | −1.0394 | −0.9062 |
| f4/f6 | 1.1033 | 1.1309 | 0.9336 |
| (R5 + R6)/f3 | 0.8193 | 0.6710 | 0.7948 |
| (R7 + R8)/f4 | 0.6404 | 0.8414 | 0.6622 |
| (R9 + R10)/f5 | −2.3934 | −2.7562 | −2.9384 |
| (R11 + R12)/f6 | −0.7641 | −0.8055 | −0.7605 |
| DTn1/DTn2 | 14.4273 | 14.4273 | 14.4273 |
| (DTn1 + DTn3)/(DTn2 + DTn4) | 1.6105 | 1.6105 | 1.6105 |

Figure 15:
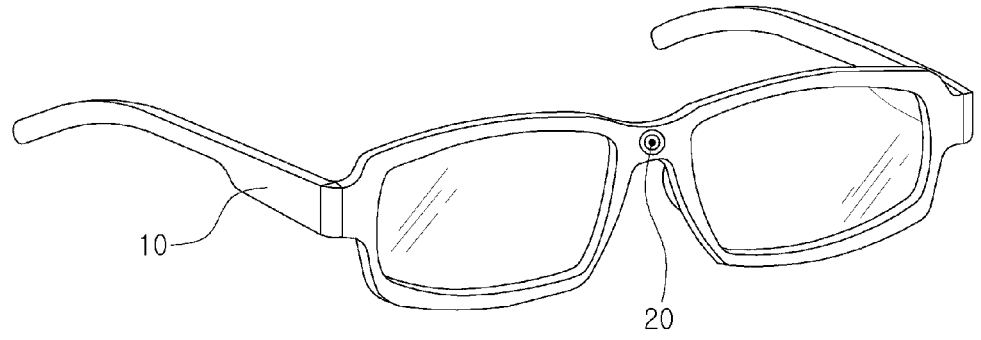
FIG. 15 illustrates example glasses on which an example optical imaging system according to the first to the seventh example embodiments is mounted.

An example AR device including an example optical imaging system will be described with reference to FIG. 15.

The example optical imaging system may be mounted in the AR device. For example, the optical imaging systems according to the first to seventh example embodiments may be mounted on a camera module 20 of AR glasses 10. However, a field and a form in which the example optical imaging system is applied are not limited to the camera module 20 for the AR glasses 10.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An optical imaging system, comprising:

a first lens having positive refractive power, and having a concave object-side surface;

a second lens having refractive power;

a third lens having refractive power;

a fourth lens having negative refractive power;

a fifth lens having a convex image-side surface; and a sixth lens having refractive power, wherein the first lens to the sixth lens are sequentially disposed from an object side to an image side, and wherein $$f \text{ number} < 1.90,$$

$$1.90 < TTL/f < 2.2,$$

and 0.90<f4/f6<1.20 where TTL is a distance from an object side of the first lens to an image plane, f is a focal length of the optical imaging system, f4 is a focal length of the fourth lens, and f6 is a focal length of the sixth lens.

2. The optical imaging system of claim 1, wherein:

$$0 < f1/f < 20,$$

where f1 is a focal length of the first lens.

3. The optical imaging system of claim 1, wherein:

$$-100 < f2/f < 100,$$

where f2 is a focal length of the second lens.

4. The optical imaging system of claim 1, wherein:

$$-30 < V1 - V2 < 40,$$

where V1 is an Abbe number of the first lens and V2 is an Abbe number of the second lens.

5. The optical imaging system of claim 1, wherein:

$$0.09 < D12/f < 0.10,$$

where D12 is a distance from an image-side surface of the first lens to an object-side surface of the second lens.

6. The optical imaging system of claim 1, wherein:

$$0.09 < D23/f < 0.10,$$

where D23 is a distance from an image-side surface of the second lens to an object-side surface of the third lens.

7. The optical imaging system of claim 1, wherein:

$$0.20 < BFL/TLx < 3.0,$$

where BFL is a distance from an image-side surface of the sixth lens to the image plane, and TLx is a distance from a point closest to an object on an object-side surface of the first lens to the image plane.

8. An electronic device, comprising the optical imaging system of claim 1.

9. An optical imaging system, comprising:
a first lens having a concave object-side surface;
a second lens having refractive power;
a third lens having refractive power;
a fourth lens having a concave object-side surface;
a fifth lens having refractive power; and
a sixth lens having refractive power,
wherein the first lens to the sixth lens are sequentially disposed from an object side to an imaging side, and wherein $$-1.0 < f3/f4 < -0.8,$$

$$1.90 < TTL/f < 2.20,$$

and 0.90<f4/f6<1.20
where TTL is a distance from an object-side surface of the first lens to an image plane, f is a focal length of the optical imaging system, f3 is a focal length of the third lens, f4 is a focal length of the fourth lens, and f6 is a focal length of the sixth lens.

10. The optical imaging system of claim 9, wherein f number is less than 1.90.

11. The optical imaging system of claim 9, wherein:

$$1.64 < TTL/\text{ImgHT} < 1.86,$$

where ImgHT is a height of the image plane.

12. The optical imaging system of claim 9, wherein:

$$0.70 < f3/\text{ImgHT} < 1.0,$$

where ImgHT is a height of the image plane.

13. The optical imaging system of claim 9, wherein:

$$-1.1 < f3/f6 < 0.80,$$

where f6 is a focal length of the sixth lens.

14. The optical imaging system of claim 9, wherein:

$$-0.80 < (R11 + R12)/f6 < -0.60,$$

where R11 is a radius of curvature of an object-side surface of the sixth lens, and R12 is a radius of curvature of an image-side surface of the sixth lens.

15. The optical imaging system of claim 9, wherein:

$$14 < DTn1/DTn2 < 15,$$

where DTn1 is a refractive index temperature coefficient according to a temperature change of the first lens, and DTn2 is a refractive index temperature coefficient according to a temperature change of the second lens.

16. The optical imaging system of claim 9, wherein:

$$1.50 < (DTn1 + DTn3)/(DTn2 + DTn4) < 1.70,$$

where DTn1 is a refractive index temperature coefficient according to a temperature change of the first lens, DTn2 is a refractive index temperature coefficient according to a temperature change of the second lens, DTn3 is a refractive index temperature coefficient according to a temperature change of the third lens, and DTn4 is a refractive index temperature coefficient according to a temperature change of the fourth lens.

17. An electronic device, comprising the optical imaging system of claim 9.

18. An optical imaging system, comprising:
a first lens, a second lens, a third lens, a fourth lens, a fifth lens, and a sixth lens;
wherein the first lens has a concave object-side surface,
wherein the fourth lens has a concave object-side surface,
wherein the fifth lens has a concave object-side surface;
wherein the sixth lens has negative refractive power,
wherein the first lens to the sixth lens are sequentially disposed from an object side to an image side, and wherein $$1.90 < TTL/f < 2.2$$

and 0.90<f4/f6<1.20,
where TTL is a distance from an object side of the first lens to an image plane, f is a focal length of the optical imaging system, f4 is a focal length of the fourth lens, and f6 is a focal length of the sixth lens.

19. An electronic device, comprising the optical imaging system of claim 18.

* * * * *